(12) United States Patent
Shioiri et al.

(10) Patent No.: US 10,859,128 B2
(45) Date of Patent: Dec. 8, 2020

(54) SELECTABLE ONE-WAY CLUTCH

(71) Applicant: TOYOTA JIDOSHA KABUSHIKI KAISHA, Toyota (JP)

(72) Inventors: Hiroyuki Shioiri, Yokohama (JP); Hiroyuki Shibata, Odawara (JP); Yuki Kurosaki, Yamato (JP); Mitsuaki Tomita, Susono (JP); Shotaro Kato, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 93 days.

(21) Appl. No.: 15/922,162

(22) Filed: Mar. 15, 2018

(65) Prior Publication Data

US 2018/0266503 A1 Sep. 20, 2018

(30) Foreign Application Priority Data

Mar. 17, 2017 (JP) .................. 2017-052817

(51) Int. Cl.
*F16D 41/16* (2006.01)
*F16D 41/12* (2006.01)
*F16D 41/14* (2006.01)

(52) U.S. Cl.
CPC .......... *F16D 41/16* (2013.01); *F16D 41/125* (2013.01); *F16D 41/14* (2013.01); *B60Y 2400/427* (2013.01); *F16D 2500/10493* (2013.01)

(58) Field of Classification Search
None
See application file for complete search history.

(56) References Cited

U.S. PATENT DOCUMENTS

| 7,258,214 B2 | 8/2007 | Pawley et al. |
| 8,844,693 B2 | 9/2014 | Pawley |
| 2016/0160942 A1 | 6/2016 | Shioiri et al. |
| 2016/0265606 A1 | 9/2016 | Shioiri et al. |
| 2017/0227072 A1* | 8/2017 | Pawley ................. F16D 41/125 |
| 2018/0087585 A1* | 3/2018 | Hand ...................... F16D 41/14 |

FOREIGN PATENT DOCUMENTS

| EP | 1944520 A2 | 7/2008 |
| JP | 2016166653 A | 9/2016 |

OTHER PUBLICATIONS

Untied States Patent and Trademark Office, U.S. Appl. No. 15/727,844, filed Oct. 9, 2017, 117 pages.

* cited by examiner

*Primary Examiner* — Timothy Hannon
(74) *Attorney, Agent, or Firm* — Hunton Andrews Kurth LLP

(57) ABSTRACT

A selectable one-way clutch includes: a pocket plate; struts; a notch plate having a plurality of notches; and a selector plate that has a plurality of window holes. The strut includes a protrusion formed at a center thereof in a radial direction of the selectable one-way clutch. The selector plate has a cutout groove extending from an inner surface of the window hole along a formation direction of the protrusion. When the selectable one-way clutch is disengaged, the cutout groove is fitted on the protrusion, and the strut and the selector plate overlap each other in a rotational axis direction of the selectable one-way clutch.

8 Claims, 18 Drawing Sheets

SELECTABLE ONE-WAY CLUTCH

INCORPORATION BY REFERENCE

The disclosure of Japanese Patent Application No. 2017-052817 filed on Mar. 17, 2017 including the specification, drawings and abstract is incorporated herein by reference in its entirety.

BACKGROUND

1. Technical Field

The present disclosure relates to a selectable one-way clutch.

2. Description of Related Art

U.S. Pat. No. 8,844,693 discloses a selectable one-way clutch that includes a pocket plate having a plurality of pockets (housing recesses) in which struts (engaging tabs) are respectively housed, a notch plate having a plurality of notches (engaging recesses) in which the struts are respectively engaged, and a selector plate located between the pocket plate and the notch plate.

SUMMARY

In a hybrid electric vehicle (HV) equipped with a selectable one-way clutch as described above, for example, when the vehicle travels in an EV mode etc., an "overrun" may occur in which the notch plate rotates in a direction (hereinafter referred to as an "overrun direction") that is opposite from an engaging direction of the selectable one-way clutch, i.e., from a direction in which the struts mesh with the notches.

During an overrun, the strut behaves so as to hit the pocket plate and the notch plate by swinging up and down therebetween. When this up-and-down hitting behavior escalates, for example, a large yaw moment My and a translational force F1 occur on a strut 52 as shown in FIG. 22 and FIG. 23. As a result, a pair of ears (inner ear 522 and outer ear 523) of the strut 52 repeatedly hits an inner surface 11a of a pocket 11 of a pocket plate 10 as shown in parts A of FIG. 22 and parts B of FIG. 23, which may shorten the life of the strut 52.

The present disclosure provides a selectable one-way clutch that can avoid shortening the life of the engaging tab and enhance the durability of the engaging tab.

An aspect of the present disclosure is a selectable one-way clutch. This selectable one-way clutch includes a pocket plate, engaging tabs, a notch plate, and a selector plate. The pocket plate has a plurality of housing recesses in a surface on one side. The engaging tabs are respectively housed in the housing recesses. The notch plate is provided so as to be rotatable relative to the pocket plate, and has a plurality of engaging recesses in a surface facing the surface of the pocket plate on the one side. The selector plate is located between the pocket plate and the notch plate. The selector plate has a plurality of window holes extending therethrough in a plate thickness direction. The selector plate is configured to rotate around the same rotational axis as the notch plate so as to switch between a state in which the engaging tab is raised from the pocket plate toward the notch plate through the window hole and a state in which the engaging tab is housed in the housing recess. The engaging tab includes a protrusion provided at the center of the engaging tab in the radial direction of the selectable one-way clutch. The selector plate has a cutout groove provided so as to extend from the window hole along the formation direction of the protrusion. The cutout groove is fitted on the protrusion, and the engaging tab and the selector plate overlap each other in the rotational axis direction of the selectable one-way clutch when the selectable one-way clutch is disengaged.

Thus, when the selectable one-way clutch is disengaged (when the selector plate is closed), the distance between the engaging tab and the notch plate in this selectable one-way clutch is smaller than the distance therebetween in the related art. Accordingly, the raised angle of the engaging tab during an overrun in this selectable one-way clutch is smaller than the raised angle in the related art. Therefore, according to this selectable one-way clutch, the speed at which the engaging tab swings down during an overrun is lower than that in the related art, and the force with which the engaging tab hits the notch plate and the pocket plate by swinging up and down therebetween is reduced.

In the above selectable one-way clutch, the engaging tab may include a main body extending along the circumferential direction of the selectable one-way clutch, and a pair of ears extending along the radial direction from an end of the main body in the circumferential direction toward the opposite sides, and constituting a rotational axis of the engaging tab when the engaging tab is raised. The main body may include the protrusion protruding from the position of an upper surface of the pair of ears. An upper surface of the protrusion may come in contact with the notch plate when the engaging tab is raised from the pocket plate toward the notch plate through the window hole.

Thus, in this selectable one-way clutch, the speed at which the engaging tab swings down during an overrun is lower than that in the related art, and the force with which the engaging tab hits the notch plate and the pocket plate by swinging up and down therebetween is reduced.

In the above selectable one-way clutch, the protrusion may have side surfaces parallel to side surfaces of the main body, and may protrude to the end of the main body on the side of the pair of ears, and the engaging tab may include inclined surfaces provided respectively on both sides of the side surfaces of the protrusion and inclined relative to the upper surface of the pair of ears.

Thus, in this selectable one-way clutch, the protrusion is provided so as to extend to the end of the main body, which can enhance the mechanical strength around joint portions between the main body and the pair of ears.

In the above selectable one-way clutch, the protrusion may have side surfaces inclined relative to side surfaces of the main body, and may be tapered toward the end of the main body on the side of the pair of ears, and the engaging tab may include inclined surfaces provided respectively on both sides of the side surfaces of the protrusion and inclined relative to the upper surface of the pair of ears.

Thus, in this selectable one-way clutch, the protrusion has a tapered shape, so that, when the cutout groove of the selector plate is fitted on the protrusion of the engaging tab, the tapered surfaces of the cutout groove and the protrusion come in contact with each other, which can reduce a bending stress occurring on the selector plate when the selector plate is closed. Accordingly, it is possible to enhance the durability of the selector plate and the actuation responsiveness of the engaging tab.

In the above selectable one-way clutch, the inclined surfaces and the protrusion may be located side by side in the radial direction, and the pair of ears and the protrusion may be located side by side in the radial direction.

Thus, in this selectable one-way clutch, the pair of ears and the protrusion are disposed side by side in the radial direction of the selectable one-way clutch, which can enhance the mechanical strength around the joint portions between the main body and the pair of ears.

In the above selectable one-way clutch, the pair of ears, the inclined surfaces, and the protrusion may be located side by side in the radial direction.

Thus, in this selectable one-way clutch, the pair of ears, the inclined surfaces, and the protrusion are disposed side by side in the radial direction of the selectable one-way clutch. Accordingly, it is possible to shorten the cutout groove of the selector plate, and thereby to enhance the rigidity and durability around the cutout groove of the selector plate.

In the above selectable one-way clutch, the inclined surface may have a curved shape from the side surface of the protrusion to the side surface of the main body.

Thus, in this selectable one-way clutch, the inclined surface has a curved shape, so that, when the cutout groove of the selector plate is fitted on the protrusion, a lower surface of the selector plate and an inner surface of the window hole slide over the inclined surfaces of the engaging tab while all the time remaining in line contact therewith. Accordingly, it is possible to reduce the contact pressure between the selector plate and the engaging tab, and thereby to enhance the wear resistance of the selector plate and the engaging tab.

In the above selectable one-way clutch, the inclined surface may include a flat contact portion parallel to a lower surface of the selector plate. The flat contact portion may be provided at a position within the inclined surface where the lower surface of the selector plate comes in contact when the selectable one-way clutch is disengaged.

Thus, in this selectable one-way clutch, when the selector plate is closed and the engaging tab is housed inside the housing recess, the lower surface of the selector plate and the flat contact portion of the engaging tab come in surface contact with each other, which allows a spring force trying to raise the engaging tab to be resisted without requiring an external force. Accordingly, it is possible to reduce the driving force of an actuator that rotates the selector plate, and thereby to downsize the actuator and achieve cost reduction.

In the above selectable one-way clutch, in the state in which the engaging tab is raised from the pocket plate toward the notch plate through the window hole, the angle of the inclined surface relative to a lower surface of the selector plate may be larger than the angle of an upper surface of the engaging tab relative to the lower surface of the selector plate.

Thus, in this selectable one-way clutch, the driving angle of an arm that actuates the selector plate can be reduced. Accordingly, it is possible to reduce the driving force of the actuator that rotates the selector plate through the arm, and thereby to downsize the actuator and achieve cost reduction.

In the above selectable one-way clutch, in the radial direction, a clearance between a side surface of the engaging tab and an inner surface of the window hole may be smaller than a clearance between the side surface of the engaging tab and a side surface of the housing recess.

Thus, in this selectable one-way clutch, the amount of movement of the engaging tab in a yaw direction can be reduced, and the movement of the engaging tab in the yaw direction can be sufficiently blocked. Accordingly, it is possible to further reduce the yaw moment and the translational force, and thereby to further reduce the force with which one or both of the pair of ears of the engaging tab hit the inner surface of the housing recess.

With the selectable one-way clutch of the present disclosure, the force with which the engaging tab hits the notch plate and the pocket plate by swinging up and down therebetween during an overrun can be reduced, and a yaw moment and a translational force can be suppressed. It is therefore possible to avoid shortening the life of the engaging tab and enhance the durability of the engaging tab.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Selectable one-way clutches (hereinafter referred to as SOWCs) according to embodiments of the present disclosure will be described with reference to the drawings.

However, the present disclosure is not limited to the following embodiments. Components in the following embodiments include those that can be easily substituted by those skilled in the art or that are substantially the same.

Figure 1A:
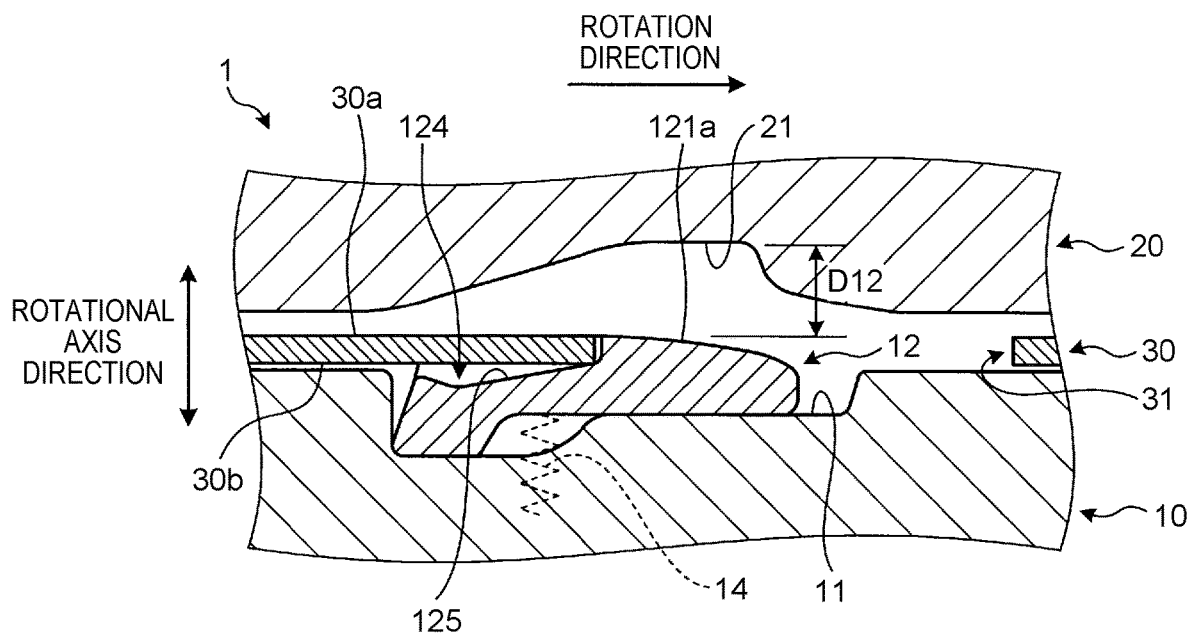
FIG. 1A is a view showing the configuration of a main part of a selectable one-way clutch according to a first embodiment of the present disclosure, and is a sectional view showing a disengaged state of the selectable one-way clutch.
Figure 1B:
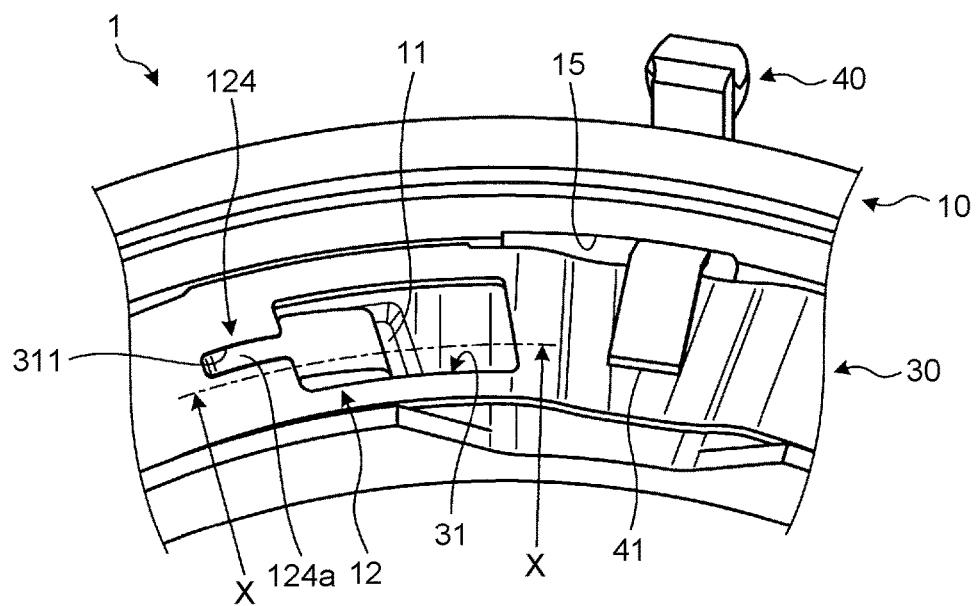
FIG. 1B is a view showing the configuration of the main part of the selectable one-way clutch according to the first embodiment of the present disclosure, and is a perspective view showing the disengaged state of the selectable one-way clutch.

An SOWC 1 according to a first embodiment is installed in a power transmission device of a hybrid electric vehicle, for example, and includes a pocket plate 10, a notch plate 20, a selector plate 30, and an arm 40 as shown in FIG. 1A and FIG. 1B. FIG. 1A is a sectional view showing the SOWC 1 as cut along the X-X direction indicated in FIG. 1B (at a position of an inner ear 122 of a strut 12 (see FIG. 3)). FIG. 1B is a perspective view showing the SOWC 1 with the notch plate 20 removed. The "rotation direction" indicated in FIG. 1A refers to a direction in which the notch plate 20 rotates during an overrun (an overrun direction; a disengaging direction of the SOWC 1).

The pocket plate 10 has a cylindrical shape. A plurality of pockets (housing recesses) 11 recessed in a plate thickness direction of the SOWC 1 are formed in a surface of the pocket plate 10 on one side, i.e., in a surface facing the notch plate 20, and plate-shaped struts (engaging tabs) 12 are respectively housed inside the pockets 11.

The pockets 11 are formed at positions corresponding to notches 21 of the notch plate 20. An elastic member 14 that urges the strut 12 toward the notch plate 20 is disposed between a recess 13 (see FIG. 7) formed inside the pocket 11 and the strut 12. When the pocket plate 10 is seen from the side of the notch plate 20, the elastic member 14 is provided at the position of the center of the strut 12 in a width direction thereof, and is actually not present in the section shown in FIG. 1A; therefore, the elastic member 14 is indicated by dashed lines for the convenience of description (the same applies to the subsequent drawings).

As the selector plate 30 rotates around the same rotational axis as the notch plate 20, the strut 12 switches between a state in which one end of the strut 12 is raised from the pocket plate 10 toward the notch plate 20 and a state in which the entire strut 12 including this one end is housed inside the pocket 11. As will be described later, the strut 12 restricts rotation of the notch plate 20 by engaging in the notch 21 under a predetermined condition.

The notch plate 20 has an annular (hollow disc) shape. The notch plate 20 is disposed so as to face the surface of the pocket plate 10 in which the pockets 11 are formed, and is configured to be rotatable relative to the pocket plate 10.

The plurality of notches (engaging recesses) 21 recessed in the plate thickness direction are formed in a surface of the notch plate 20 facing the pocket plate 10. The notch 21 is a recess into which the one end of the strut 12 raised from the pocket plate 10 toward the notch plate 20 through a window hole 31 of the selector plate 30 enters.

The selector plate 30 has an annular (hollow disc), plate-like shape. The selector plate 30 is located between the pocket plate 10 and the notch plate 20. The selector plate 30 switches between an engaged state and a disengaged state of the SOWC 1 as will be described later, by rotating a predetermined angle around the same rotational axis as the notch plate 20. The window holes 31 that extend through the selector plate 30 in the plate thickness direction are formed at positions corresponding to the pockets 11 of the pocket plate 10 and the struts 12.

Here, when the position of the window hole 31 is shifted from the position of the pocket 11 in a circumferential direction of the SOWC 1, the strut 12 is pushed toward the pocket 11 by a lower surface 30b of the selector plate 30, so that the strut 12 is housed inside the pocket 11 as shown in FIG. 1A and FIG. 1B. Thus, the SOWC 1 becomes disengaged. In this disengaged state, the strut 12 does not engage in the notch 21 (engagement between the strut 12 and the notch 21 is dissolved), so that no torque is transmitted between the pocket plate 10 and the notch plate 20.

Figure 2A:
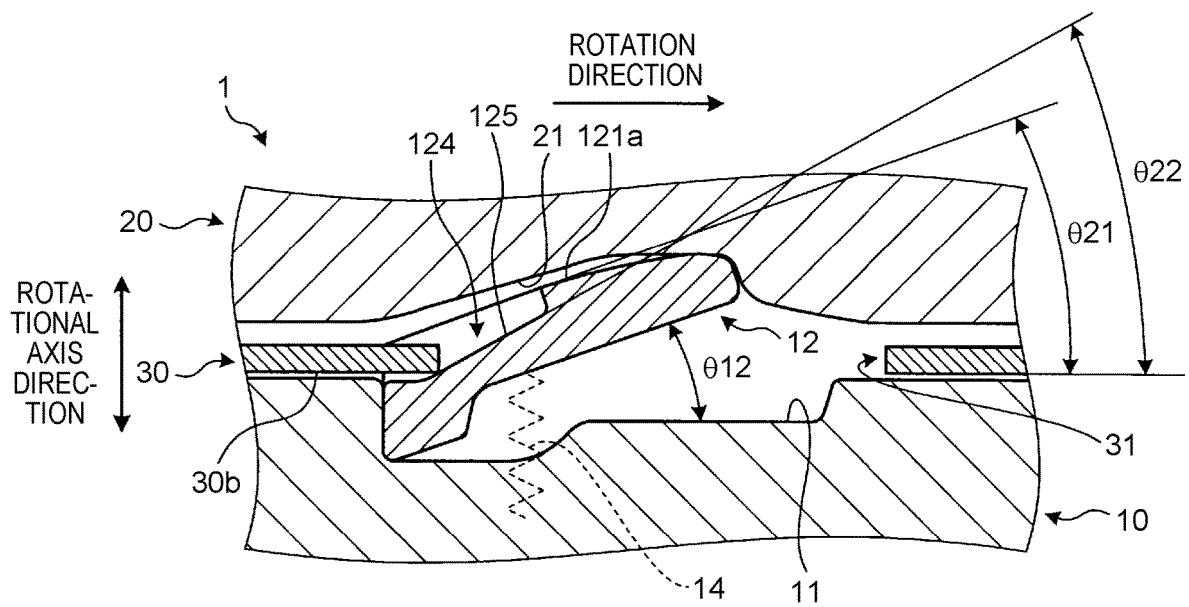
FIG. 2A is a view showing the configuration of the main part of the selectable one-way clutch according to the first embodiment of the present disclosure, and is a sectional view showing an engaged state of the selectable one-way clutch.
Figure 2B:
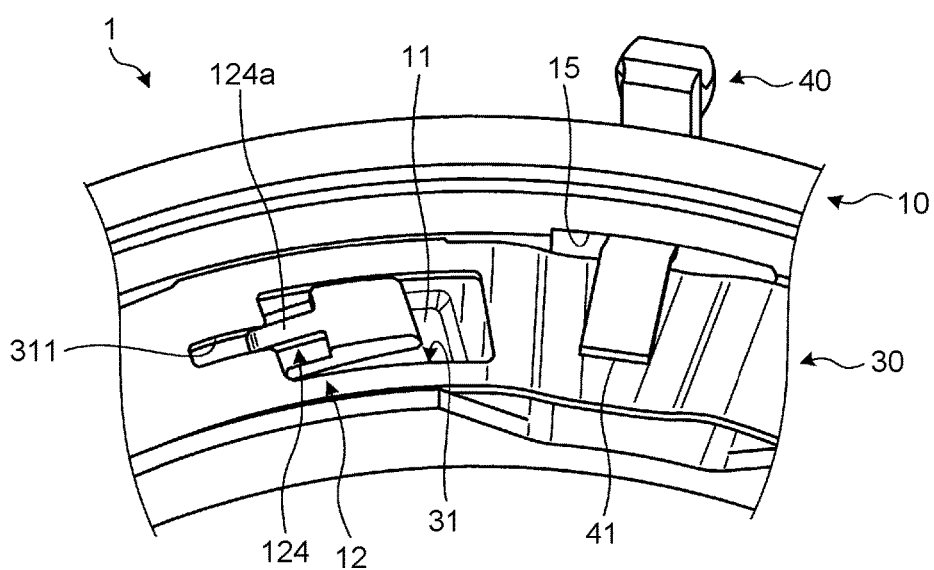
FIG. 2B is a view showing the configuration of the main part of the selectable one-way clutch according to the first embodiment of the present disclosure, and is a perspective view showing the engaged state of the selectable one-way clutch.

On the other hand, when the position of the window hole 31 roughly coincides with the position of the pocket 11 in the circumferential direction of the SOWC 1, the one end of the strut 12 is pushed by the elastic member 14 so as to be raised from the pocket plate 10 toward the notch plate 20 through the window hole 31 as shown in FIG. 2A and FIG. 2B. When the notch plate 20 rotates in an engaging direction (the opposite direction from the "rotation direction" indicated in FIG. 1A) relative to the pocket plate 10 with the one end of the strut 12 thus raised from the pocket plate 10 toward the notch plate 20, the strut 12 engages in the notch 21 and the SOWC 1 becomes engaged. In this engaged state, the strut 12 engages in the notch 21, allowing a torque to be transmitted between the pocket plate 10 and the notch plate 20.

The arm 40 transmits the driving force of an actuator (not shown), provided outside the SOWC 1, to the selector plate 30. A terminal end 41 of the arm 40 is inserted into a cutout 15 formed in an outer circumference of the pocket plate 10, and is coupled to the selector plate 30 inside the pocket plate 10. As shown in FIG. 1B, a leading end of the arm 40 exposed through the cutout 15 to the outside of the SOWC 1 is coupled to the actuator (not shown). As this actuator is driven, the selector plate 30 is rotated through the arm 40.

In the following, the specific configurations and actions of a strut 52 and a selector plate 70 of an SOWC 101 of the related art will be described with reference to FIG. 22 to FIG. 27.

Figure 24:
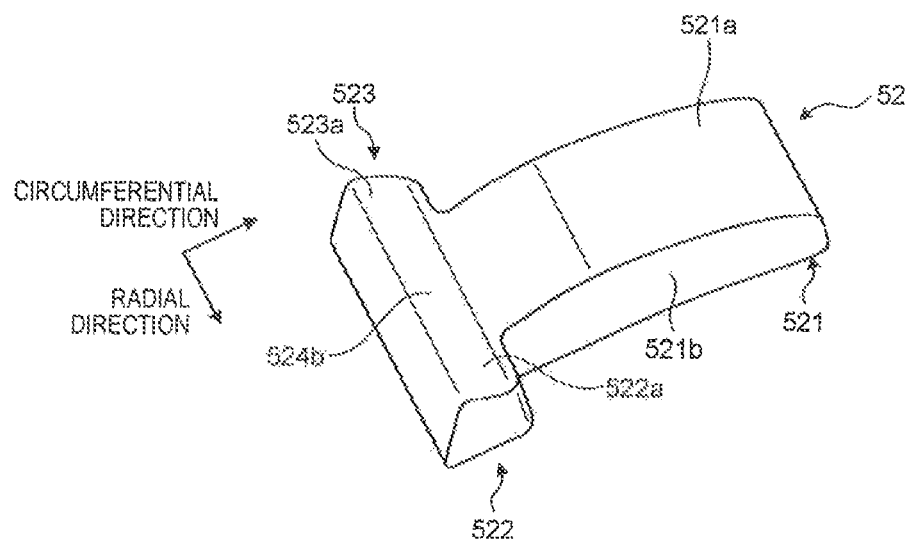
FIG. 24 is a perspective view showing the configuration of the strut of the selectable one-way clutch according to the related art.

As shown in FIG. 24, the strut 52 of the related art includes a main body 521, an inner ear 522, and an outer ear 523. An upper surface 521a of the main body 521 has an even, gently curved shape. The main body 521 has a flat portion 524b that is provided between the inner ear 522 and the outer ear 523 so as to connect an upper surface 522a of the inner ear 522 and an upper surface 523a of the outer ear 523 to each other. Thus, in the strut 52, the upper surface 522a of the inner ear 522, the upper surface 523a of the outer ear 523, and the flat portion 524b form one flat surface.

Figure 25:
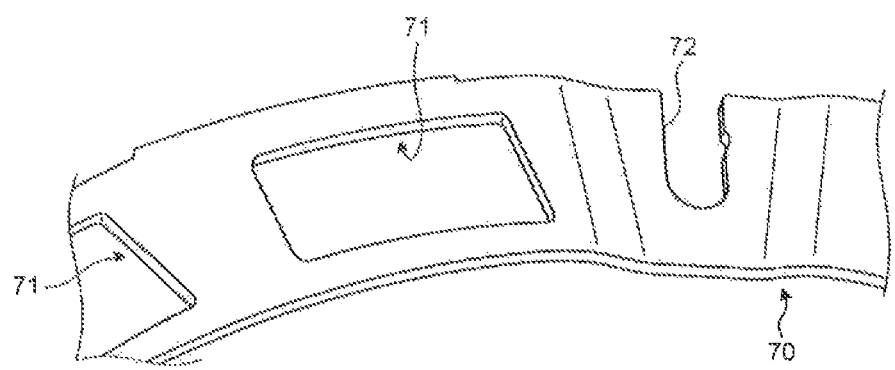
FIG. 25 is a perspective view showing the configuration of a selector plate of the selectable one-way clutch according to the related art.

As shown in FIG. 25, the selector plate 70 of the related art has a plurality of rectangular window holes 71, and a cutout 72 through which the arm 40 (see FIG. 1B) is coupled.

Figure 26:
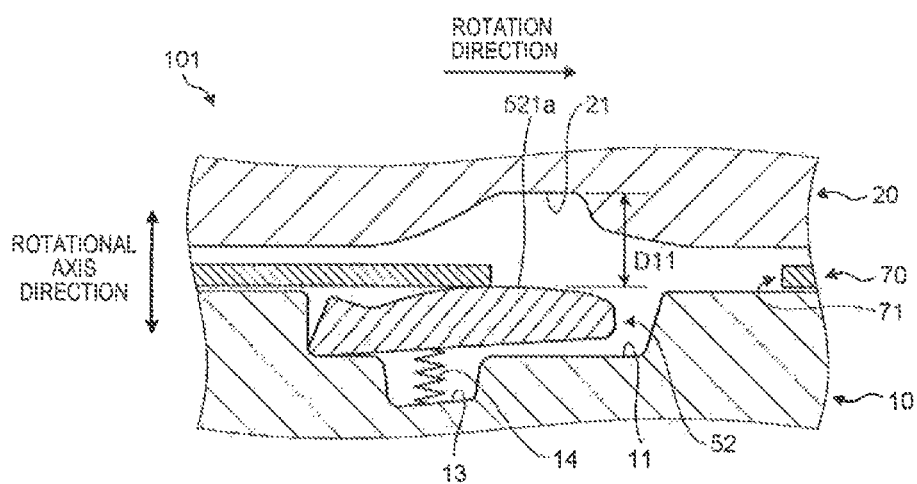
FIG. 26 is a view showing the configuration of a main part of the selectable one-way clutch according to the related art, and is a sectional view showing a disengaged state of the selectable one-way clutch.
Figure 27:
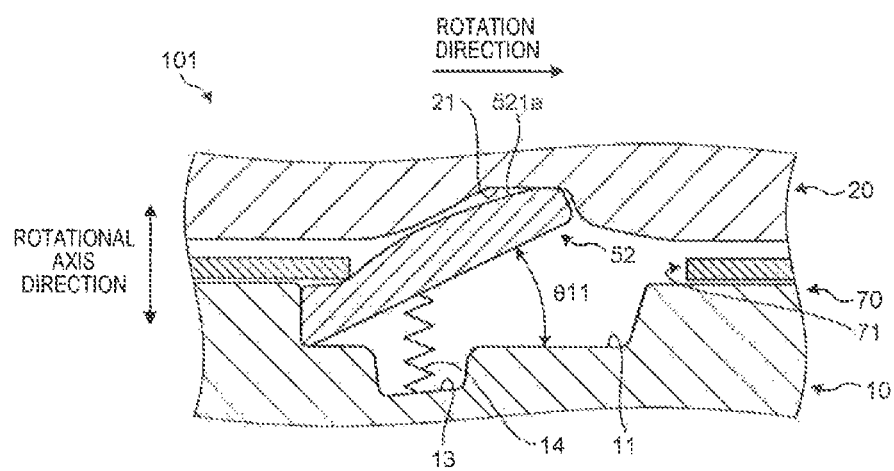
FIG. 27 is a view showing the configuration of the main part of the selectable one-way clutch according to the related art, and is a sectional view showing an engaged state of the selectable one-way clutch.

In the SOWC 101 of the related art thus configured, if the selector plate 70 accidentally rotates in a releasing direction as shown in FIG. 26, for example, due to electrical failure of the actuator (not shown) that drives the arm 40, while the notch plate 20 is rotating at a high speed in the overrun direction, the strut 52 is raised toward the notch plate 20 by the spring force of the elastic member 14 as shown in FIG. 27. Then, the strut 52 repeatedly hits the notch plate 20 rotating at a high speed and the pocket plate 10 by swinging up and down therebetween. As a result, a tensile stress due to this hitting concentrates around joint portions between the main body 521 (flat portion 524b) and the inner and outer ears 522, 523 that are portions with the lowest mechanical strength in the strut 52. This may shorten the life of the strut 52.

Here, as shown in FIG. 26 and FIG. 27, in the process in which the strut 52 repeatedly hits the notch plate 20 and the pocket plate 10 by swinging up and down therebetween, the strut 52 accelerates beyond the restoring force of the elastic member 14 and is raised deep into the notch 21. As a result, the strut 52 is swung down by the notch plate 20 at a high speed, and a yaw moment My (see FIG. 22) and a translational force F1 (see FIG. 23) occur on the strut 52, causing one or both of the inner ear 522 and the outer ear 523 to hit an inner surface 11a of the pocket 11 at a high speed.

Reasons why the strut 52 is swung down by the notch plate 20 toward the pocket plate 10 at a high speed include that a raised angle θ11 of the strut 52 is large in the SOWC 101 of the related art as shown in FIG. 27, and accordingly the speed (hereinafter referred to as a "swing-down speed") at which the strut 52 is swung down by the notch plate 20 rotating at a high speed is high.

Figure 22:
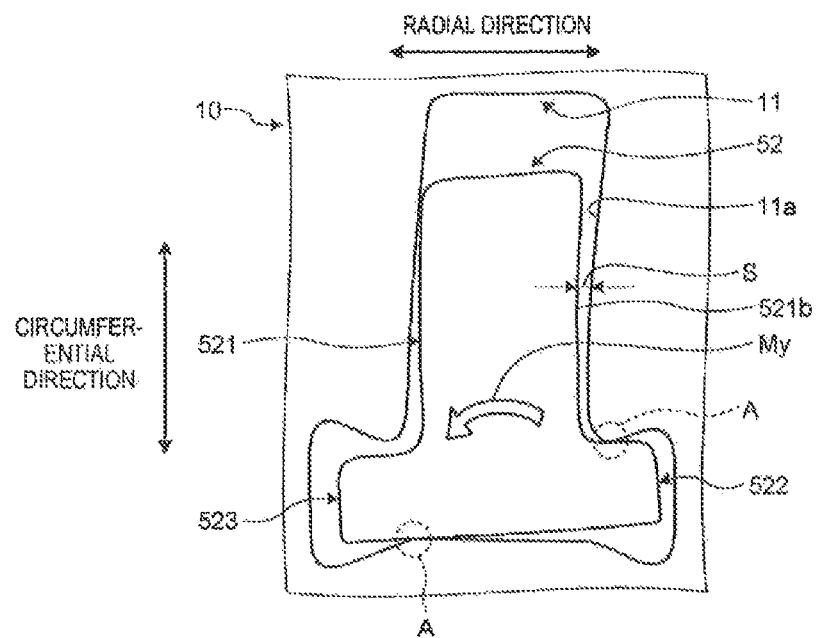
FIG. 22 is a plan view illustrating a yaw moment occurring on a strut during an overrun in a selectable one-way clutch according to the related art.
Figure 23:
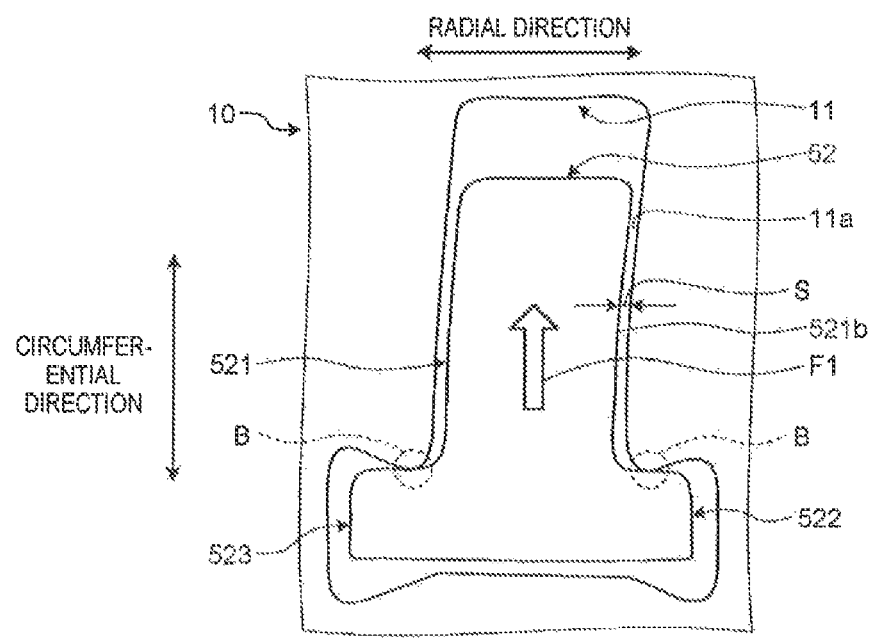
FIG. 23 is a plan view illustrating a translational force occurring on the strut during an overrun in the selectable one-way clutch according to the related art.

Reasons why the yaw moment My and the translational force F1 occur on the strut 52 include, other than that the raised angle θ11 of the strut 52 is large, that, for manufacturing reasons, a clearance S between the inner surface 11a of the pocket 11 and a side surface 521b of the main body 521 of the strut 52 that determines the posture of the strut 52 is set to be large in the SOWC 101 of the related art as shown in FIG. 22 and FIG. 23, and therefore the movement of the strut 52 in a yaw direction cannot be sufficiently blocked.

In view of the above, in the SOWC 1 according to the first embodiment, the shapes of the strut 12 and the selector plate 30 are changed from those of the related art so as to suppress the phenomenon in which the strut 12 is swung down at a high speed by the notch plate 20 and the phenomenon in which the yaw moment My and the translational force F1 occur on the strut 12 as described above. In the following, the specific configurations of the strut 12 and the selector plate 30 of the SOWC 1 in this embodiment will be described with reference to FIG. 3 and FIG. 4.

Figure 3:
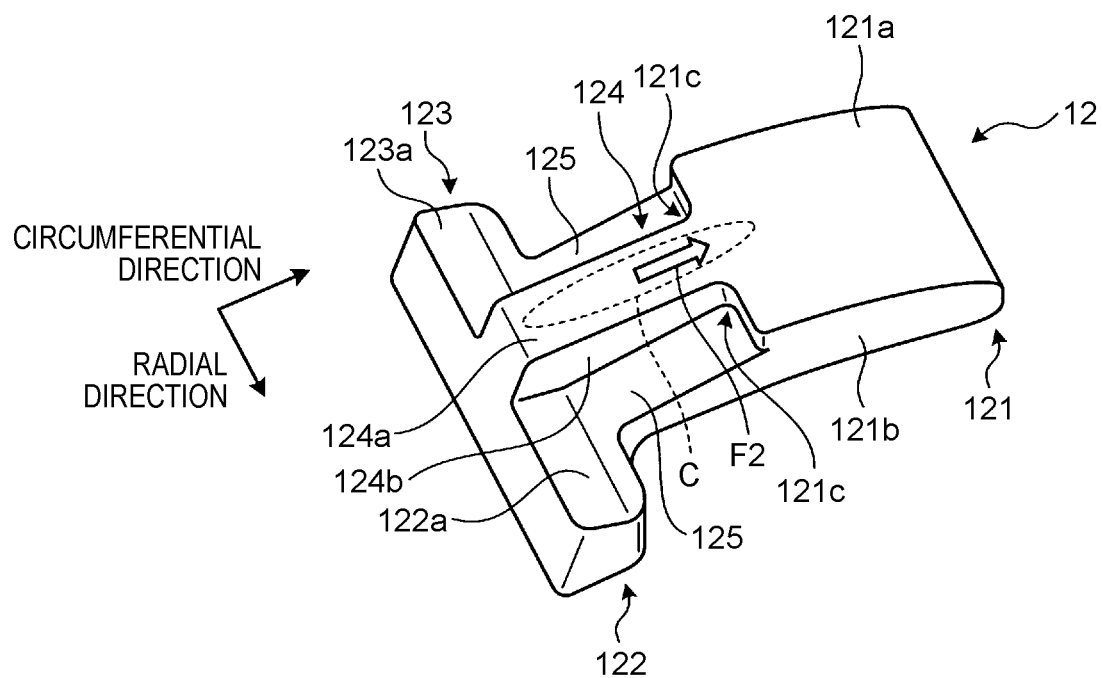
FIG. 3 is a perspective view showing the configuration of a strut of the selectable one-way clutch according to the first embodiment of the present disclosure.

As shown in FIG. 3, the strut 12 includes a main body 121 extending along a circumferential direction of the pocket plate 10, and an inner ear 122 and an outer ear 123 extending along a radial direction of the SOWC 1 from an end of the main body 121 (an end thereof in the circumferential direction of the SOWC 1) toward the opposite sides. The inner ear 122 and the outer ear 123 constitute a rotational axis of the strut 12 when the strut 12 is raised.

An upper surface 121a of the main body 121 has a gently curved shape. The main body 121 includes a protrusion 124 and inclined surfaces 125. The protrusion 124 is formed at the center of the upper surface 121a of the main body 121 in a width direction thereof, i.e., at the center of the upper surface 121a of the main body 121 in the radial direction of the SOWC 1, and is formed along the circumferential direction of the SOWC 1. The protrusion 124 is formed from this position at the center of the upper surface 121a of the main body 121 in a length direction thereof to the end of the main body 121. "The end of the main body 121" refers to the end of the main body 121 in an extension direction thereof, and the end on the side of the inner ear 122 and the outer ear 123 in the circumferential direction of the SOWC 1.

An upper surface 124a of the protrusion 124 protrudes from the position of an upper surface 122a of the inner ear 122 and an upper surface 123a of the outer ear 123 in a plate thickness direction of the strut 12. Thus, the upper surface 124a of the protrusion 124 is provided at a higher level in the plate thickness direction of the strut 12 than the upper surface 122a of the inner ear 122 and the upper surface 123a of the outer ear 123.

The upper surface 124a of the protrusion 124 serves as a contact portion that comes in contact with the notch plate 20 when the SOWC 1 is disengaged (the selector plate 30 is released) and the strut 12 is raised from the pocket plate 10 toward the notch plate 20 through the window hole 31. Side surfaces 124b of the protrusion 124 are formed so as to be parallel to side surfaces 121b of the main body 121. Thus, the protrusion 124 has a constant width when seen from above.

While the side surfaces 124b of the protrusion 124 and the side surfaces 121b of the main body 121 both have a flat shape in FIG. 3, at least one of these side surfaces may have a curved shape with a predetermined radius of curvature. Therefore, the above description that the side surfaces 124b of the protrusion 124 are parallel to the side surfaces 121b of the main body 121 includes not only a case where both side surfaces are perfectly parallel to each other but also a case where these are roughly (substantially) parallel to each other.

The inclined surfaces 125 are formed respectively on both sides of the side surfaces 124b of the protrusion 124, and are inclined relative to the upper surface 122a of the inner ear 122 and the upper surface 123a of the outer ear 123. In the strut 12 thus configured, the inclined surfaces 125 and the protrusion 124 are located side by side in the radial direction of the SOWC 1, and the inner ear 122, the outer ear 123, and the protrusion 124 are located side by side in the radial direction of the SOWC 1.

Figure 4:
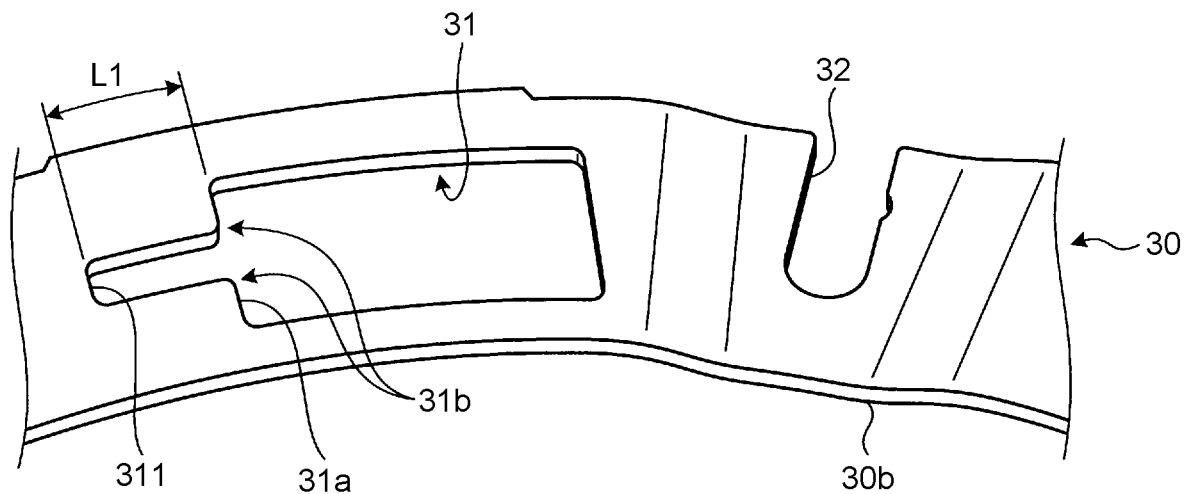
FIG. 4 is a perspective view showing the configuration of a selector plate of the selectable one-way clutch according to the first embodiment of the present disclosure.

As shown in FIG. 4, the selector plate 30 has the plurality of rectangular window holes 31, and the cutout 32 through which the arm 40 (see FIG. 1B) is coupled. The selector plate 30 further has a cutout groove 311 that is formed so as to extend from an inner surface 31a of the window hole 31 along the formation direction of the protrusion 124, i.e., the circumferential direction of the SOWC 1. The cutout groove 311 is shaped so as to protrude from the window hole 31, and has a length roughly equal to the length of the protrusion 124 of the strut 12.

In the SOWC 1 including the strut 12 and the selector plate 30 with the shapes as described above, when the SOWC 1 is disengaged (when the selector plate 30 is closed), the cutout groove 311 of the selector plate 30 moves so as to slide relative to the protrusion 124 of the strut 12, and the cutout groove 311 is fitted on the protrusion 124 as shown in FIG. 1A and FIG. 1B. Then, as shown in FIG. 1A, the strut 12 and the selector plate 30 overlap each other in a rotational axis direction of the SOWC 1. Specifically, this state in which the strut 12 and the selector plate 30 overlap each other in the rotational axis direction of the SOWC 1 refers to a state in which at least the lower surface 30b of the selector plate 30 is located farther on a lower side in the rotational axis direction than the upper surface 121a of the main body 121 of the strut 12, and preferably a state in which the upper surface 121a of the main body 121 of the strut 12 and an upper surface 30a of the selector plate 30 are located at almost the same level, as shown in FIG. 1A.

Thus, as shown in FIG. 1A, when the SOWC 1 is disengaged (when the selector plate 30 is closed), the distance between the strut 12 and the notch plate 20, i.e., a distance D12 between the upper surface 121a of the main body 121 of the strut 12 and a bottom surface of the notch 21 is smaller than a distance D11 (see FIG. 26) in the SOWC 101 of the related art. Accordingly, as shown in FIG. 2A, a raised angle θ12 of the strut 12 during an overrun is smaller than the raised angle θ11 (see FIG. 27) in the SOWC 101 of the related art. Thus, according to the SOWC 1 of this embodiment, the swing-down speed of the strut 12 during an overrun is lower than that in the related art, and the force with which the strut 12 hits the notch plate 20 and the pocket plate 10 by swinging up and down therebetween is reduced.

In the SOWC 1, the raised angle θ12 of the strut 12 is limited as the cutout groove 311 of the selector plate 30 is fitted on the protrusion 124 provided at the center of the strut 12 in the width direction. Thus, part C indicated in FIG. 3, namely the upper surface 124a of the protrusion 124 comes in contact with the notch plate 20 during an overrun. Accordingly, when the strut 12 hits the notch plate 20, a downward force from the notch plate 20 acts on the strut 12, and a frictional force F2 from the notch plate 20 occurs on the upper surface 124a of the protrusion 124. Thus, in the SOWC 1 having the protrusion 124, the frictional force F2 acts on the protrusion 124 when the strut 12 hits the notch plate 20, and this frictional force F2 acts evenly in the width direction of the strut 12, so that a rolling movement of the strut 12 can be suppressed.

Figure 5:
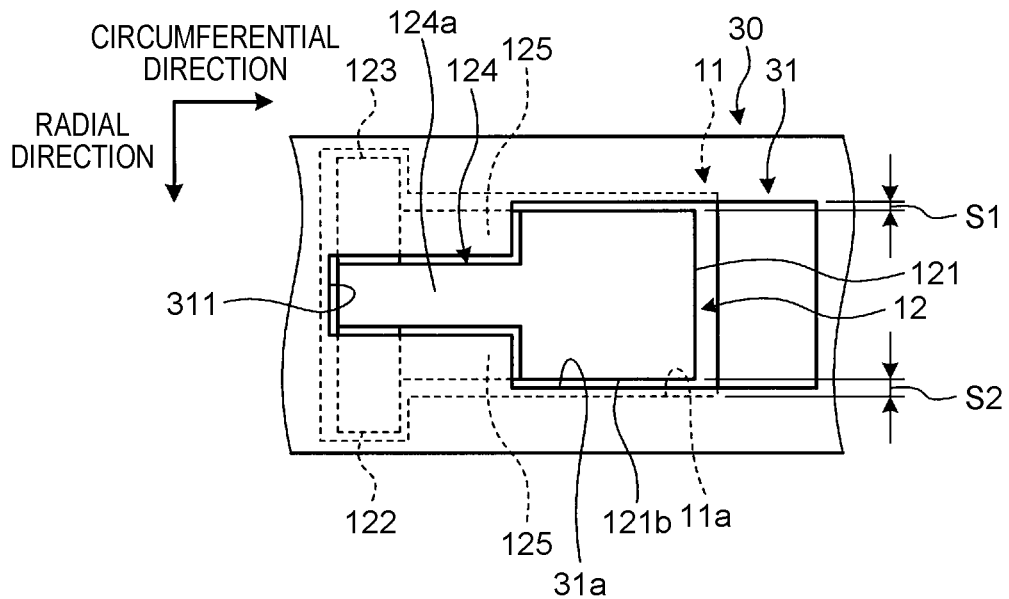
FIG. 5 is a plan view showing a relation between a clearance between a side surface of the strut and an inner surface of a window hole and a clearance between the side surface of the strut and a side surface of a pocket, during disengagement of the selectable one-way clutch according to the first embodiment of the present disclosure.
Figure 6:
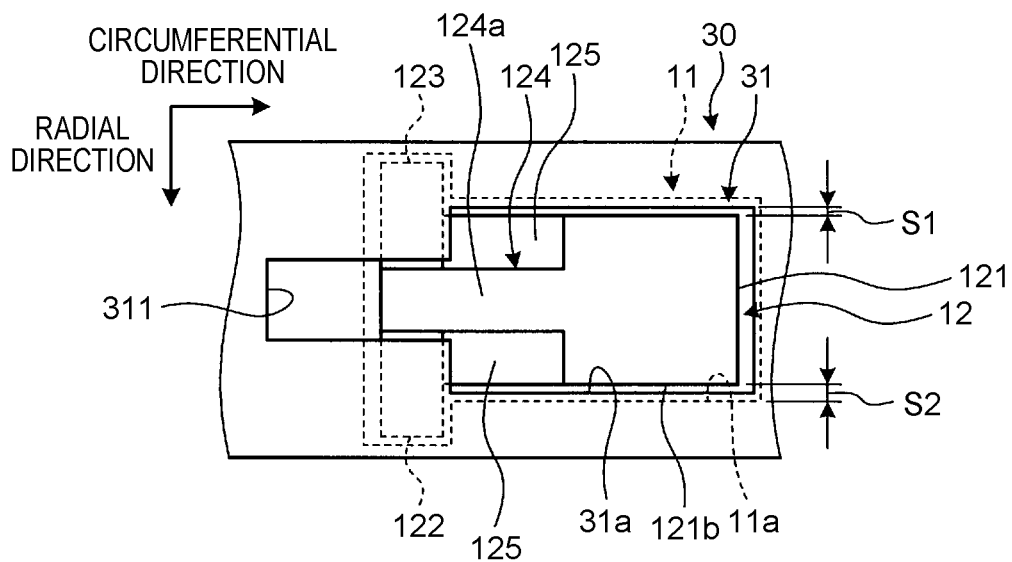
FIG. 6 is a plan view showing a relation between the clearance between the side surface of the strut and the inner surface of the window hole and the clearance between the side surface of the strut and the side surface of the pocket, during engagement of the selectable one-way clutch according to the first embodiment of the present disclosure.

Here, as shown in FIG. 5 and FIG. 6, in the radial direction of the SOWC 1, a clearance S1 between the side surface 121b of the main body 121 of the strut 12 and the inner surface 31a of the window hole 31 of the selector plate 30 is preferably set to be smaller than a clearance S2 between the side surface 121b of the main body 121 of the strut 12 and the inner surface 11a of the pocket 11 in the SOWC 1.

Thus, the amount of movement of the strut 12 in the yaw direction can be reduced, and the movement of the strut 12 in the yaw direction can be sufficiently blocked. Accordingly, it is possible to further reduce the yaw moment My and the translational force F1, and to further reduce the force with which one or both of the inner ear 122 and the outer ear 123 of the strut 12 hits the inner surface 11a of the pocket 11.

Setting the clearance S1 and the clearance S2 to the relation (clearance S1<clearance S2) as shown in FIG. 5 and FIG. 6 is possible in the structure of the SOWC 1 according to this embodiment, while this is not possible in the structure of the SOWC 101 according to the related art.

For example, in the SOWC 1 according to this embodiment, when the selector plate 30 is closed (when the SOWC 1 is disengaged), the strut 12 and the selector plate 30 overlap each other in the rotational axis direction of the SOWC 1 as shown in FIG. 1A. Since the position of the strut 12 and the movement thereof in the yaw direction inside the pocket 11 are restricted as the cutout groove 311 of the selector plate 30 is fitted on the protrusion 124 of the strut 12, the strut 12 is raised straight upward when the selector plate 30 is released. Thus, even when the clearance S1 between the strut 12 and the window hole 31 is set to be smaller than the clearance S2 between the strut 12 and the pocket 11, the strut 12 can be raised normally without getting caught on the window hole 31.

By contrast, in the SOWC 101 according to the related art, when the selector plate 70 is closed (when the SOWC 101 is disengaged), the strut 52 and the selector plate 70 do not overlap each other in the rotational axis direction of the SOWC 101 as shown in FIG. 26. Moreover, the position of the strut 52 and the movement thereof in the yaw direction inside the pocket 11 are not restricted, so that the strut 52 may fail to rise straight upward when the selector plate 70 is released. Thus, if the clearance between the strut 52 and the window hole 71 is set to be smaller than the clearance between the strut 52 and the pocket 11, the strut 52 may fail to rise normally by getting caught on the window hole 71.

Here, in the SOWC 1, an angle $\theta 22$ of the inclined surface 125 relative to the lower surface 30b of the selector plate 30 when the strut 12 is raised from the pocket plate 10 toward the notch plate 20 through the window hole 31 during an overrun is preferably set to be larger than an angle $\theta 21$ of the upper surface 121a of the main body 121 of the strut 12 relative to the lower surface 30b of the selector plate 30, as shown in FIG. 2A.

Figure 7:
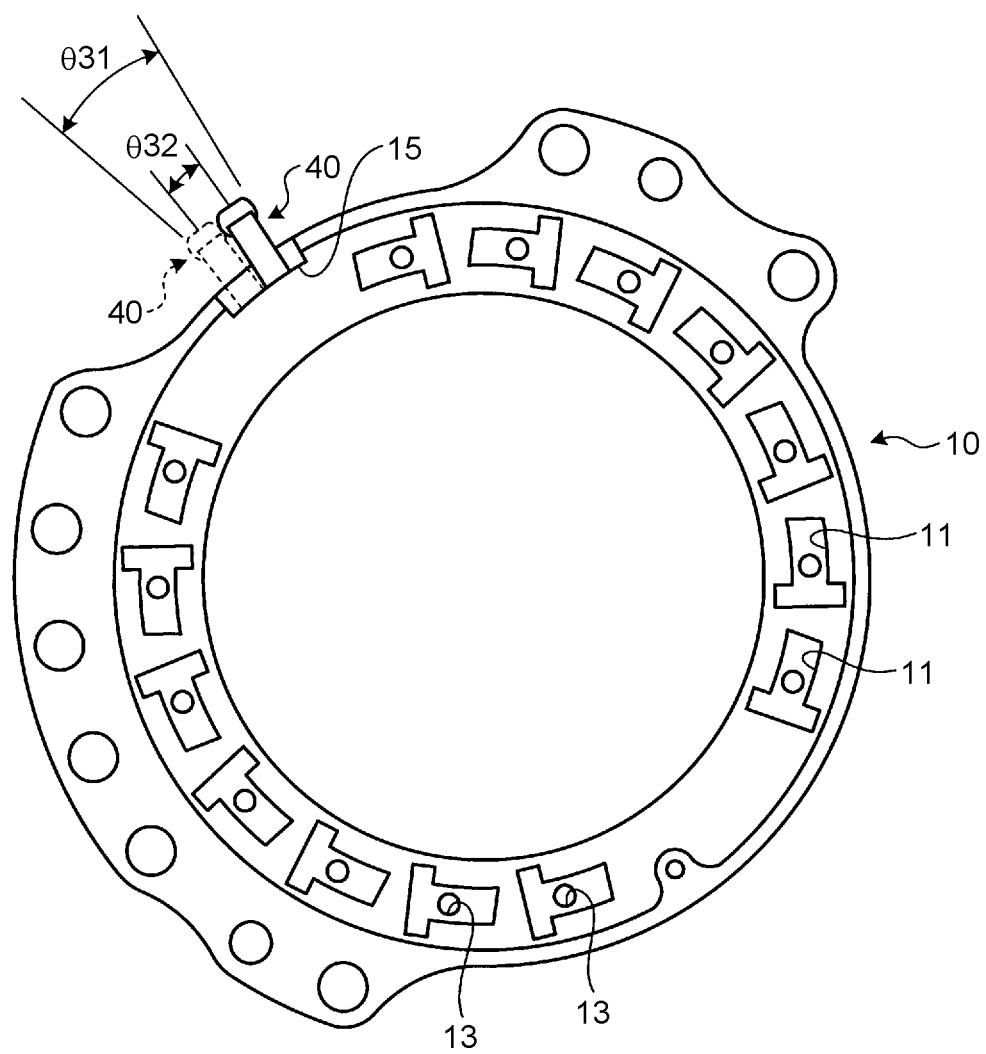
FIG. 7 is a plan view illustrating a difference between an operation angle of the selector plate in the selectable one-way clutch according to the first embodiment of the present disclosure and that in the related art.

Thus, compared with the SOWC 101 of the related art (see FIG. 27) including the strut 52 that does not have the inclined surfaces 125, the contact angle of the lower surface 30b of the selector plate 30 relative to the strut 12 (specifically, the inclined surfaces 125) when the selector plate 30 is closed is reduced, so that the strut 12 can be housed in the pocket 11 by a shorter stroke than in the related art. Accordingly, as shown in FIG. 7, a driving angle $\theta 32$ of the arm 40 that actuates the selector plate 30 can be set to be smaller than a driving angle $\theta 31$ in the SOWC 101 of the related art. It is therefore possible to reduce the amount of stroke of the actuator (not shown) that actuates the arm 40 so as to rotate the selector plate 30, and thereby to downsize the actuator and achieve cost reduction.

According to the SOWC 1 of the first embodiment as has been described above, the force with which the strut 12 hits the notch plate 20 and the pocket plate 10 by swinging up and down therebetween during an overrun can be reduced, and the yaw moment My and the translational force F1 can be suppressed. Thus, it is possible to avoid shortening the life of the strut 12 and enhance the durability of the strut 12.

According to the SOWC 1, the inner ear 122, the outer ear 123, and the protrusion 124 are disposed side by side in the radial direction of the SOWC 1, i.e., the protrusion 124 is provided so as to extend to the end of the main body 121. Thus, it is possible to enhance the mechanical strength around the joint portions between the main body 121 and the inner and outer ears 122, 123.

Figure 8:
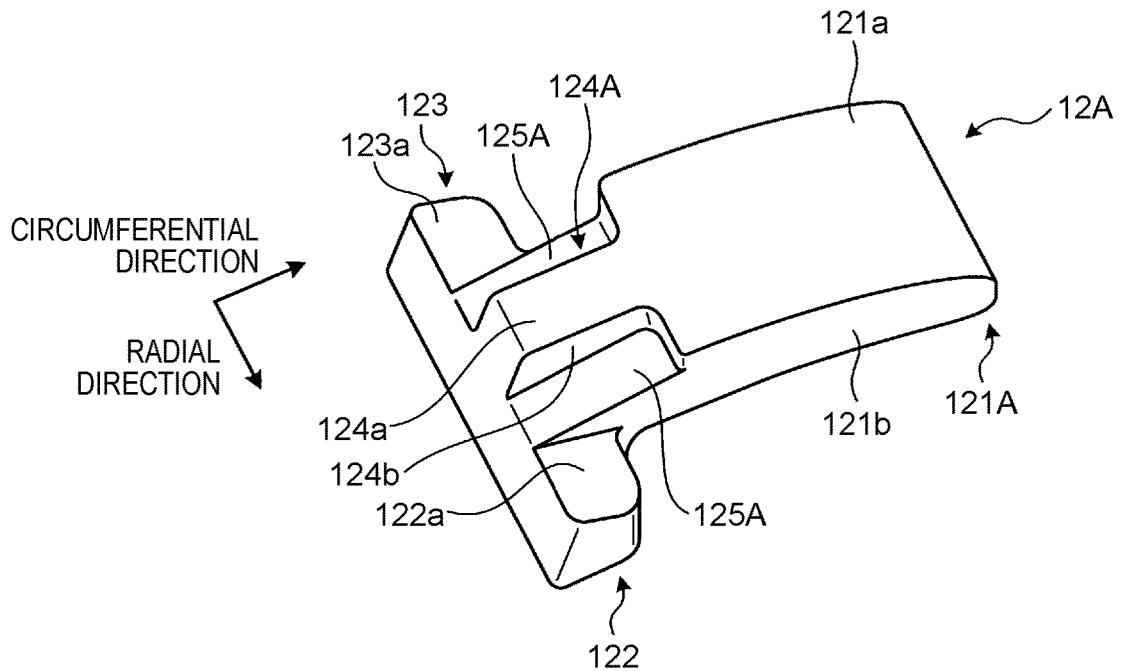
FIG. 8 is a perspective view showing the configuration of a strut of a selectable one-way clutch according to a second embodiment of the present disclosure.

An SOWC according to a second embodiment will be described with reference to FIG. 8 and FIG. 9. The SOWC according to this embodiment includes a strut 12A shown in FIG. 8 and a selector plate 30A shown in FIG. 9, but the configuration of this SOWC is otherwise the same as that of the first embodiment.

The strut 12A is obtained by extending the inclined surfaces 125 of the strut 12 of the first embodiment to the end of the main body 121. As shown in FIG. 8, the strut 12A includes a main body 121A, the inner ear 122, and the outer ear 123. A protrusion 124A is provided on the upper surface 121a of the main body 121A along the circumferential direction of the SOWC. A pair of inclined surfaces 125A are provided respectively on both sides of the side surfaces 124b of the protrusion 124A.

The protrusion 124A is formed at the center of the upper surface 121a of the main body 121A in the width direction. The protrusion 124A is formed from a position closer to the end of the main body 121A than the center of the upper surface 121a of the main body 121A in the length direction. The length of the protrusion 124A (the length thereof in the circumferential direction of the SOWC) is shorter than the length of the protrusion 124 of the strut 12 of the first embodiment. Like the protrusion 124A, the inclined surface 125A is formed to a position at the end of the main body 121A. In the strut 12A thus configured, the inner ear 122, the outer ear 123, the inclined surfaces 125A, and the protrusion 124A are located side by side in the radial direction of the SOWC.

Figure 9:
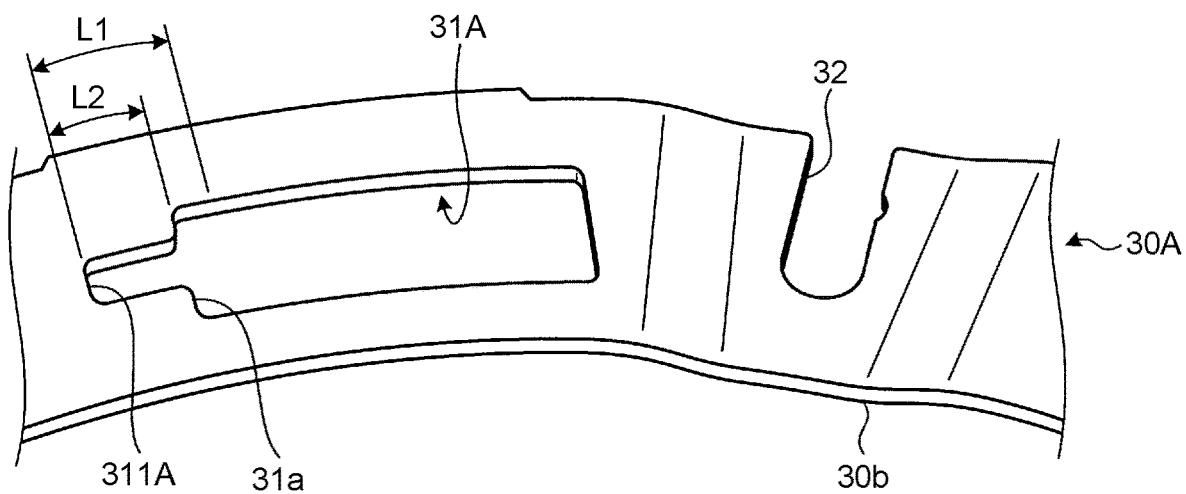
FIG. 9 is a perspective view showing the configuration of a selector plate of the selectable one-way clutch according to the second embodiment of the present disclosure.

As shown in FIG. 9, the selector plate 30A has a plurality of rectangular window holes 31A and the cutout 32. The selector plate 30A further has a cutout groove 311A that is formed so as to extend from the inner surface 31A of the window hole 31A along the formation direction of the protrusion 124A of the strut 12A. A length L2 of the cutout groove 311A (the length thereof in the circumferential direction of the SOWC) is shorter than a length L1 of the cutout groove 311 (see FIG. 4) of the selector plate 30 of the first embodiment.

According to the SOWC of the second embodiment as has been described above, the inner ear 122, the outer ear 123, the inclined surfaces 125A, and the protrusion 124A are disposed side by side in the radial direction of the SOWC. Thus, it is possible to shorten the cutout groove 311A of the selector plate 30A, and thereby to enhance the rigidity and durability around the cutout groove 311A of the selector plate 30A. Moreover, shortening the cutout groove 311A can reduce the amount of stroke of the actuator (not shown) that actuates the arm 40 (see FIG. 7) so as to rotate the selector plate 30A, which makes it possible to downsize the actuator and achieve cost reduction.

According to the SOWC of the second embodiment, the protrusion 124A is provided so as to extend to the end of the main body 121A as in the first embodiment. Thus, the mechanical strength around the joint portions between the main body 121A and the inner and outer ears 122, 123 can be enhanced.

According to the SOWC of the second embodiment, the inclined surfaces 125A are provided so as to extend to the end of the main body 121A. Thus, compared with the first embodiment (see FIG. 3) in which the inclined surfaces 125 do not extend to the end of the main body 121, the thickness of the ends of the inclined surfaces 125A can be increased, and the rigidity and durability of the strut 12A can be thereby further enhanced.

Figure 10:
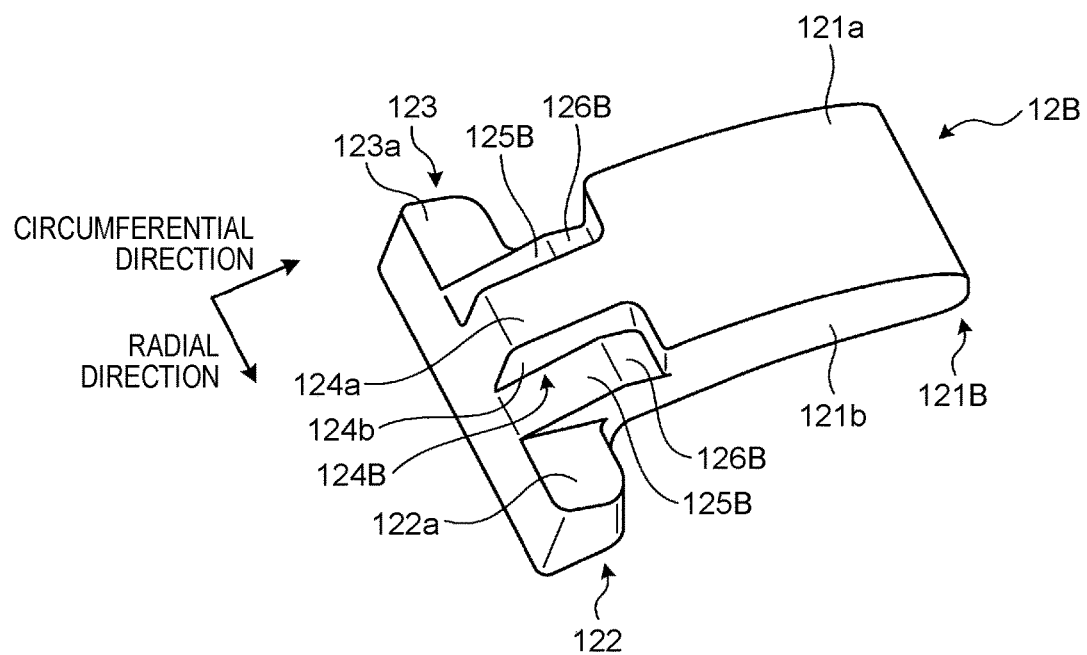
FIG. 10 is a perspective view showing the configuration of a strut of a selectable one-way clutch according to a third embodiment of the present disclosure.

An SOWC 1B according to a third embodiment will be described with reference to FIG. 10 and FIG. 11. The SOWC 1B according to this embodiment includes a strut 12B shown in FIG. 10, but the configuration of the SOWC 1B is otherwise the same as that of the second embodiment.

The strut 12B is obtained by imparting a flat shape to a portion of each inclined surface 125A of the strut 12A of the second embodiment. As shown in FIG. 10, the strut 12B includes a main body 121B, the inner ear 122, and the outer ear 123. A protrusion 124B is provided on the upper surface 121a of the main body 121B along the circumferential direction of the SOWC 1B. A pair of inclined surfaces 125B are provided respectively on both sides of the side surfaces 124b of the protrusion 124B. A flat contact portion 126B is provided at the position of the top of each inclined surface 125B, i.e., between the inclined surface 125B and the upper surface 121a of the main body 121B.

The protrusion 124B is formed at the center of the upper surface 121a of the main body 121B in the width direction. The protrusion 124B is formed at the same position and with the same length as the protrusion 124A of the second embodiment.

The flat contact portion 126B is provided at the position of the top of the inclined surface 125B. Specifically, as shown in FIG. 11, the flat contact portion 126B is provided at a position within the inclined surface 125B where the lower surface 30b of the selector plate 30A comes in contact with the inclined surface 125B when the selector plate 30A is closed (when the SOWC 1B is disengaged), i.e., at a position within the inclined surface 125B where the lower surface 30b comes in contact when the selector plate 30A makes a full stroke. The flat contact portion 126B is formed so as to be parallel to the lower surface 30b of the selector plate 30A when the selector plate 30A is closed. In the strut 12B thus configured, as shown in FIG. 10, the flat contact portions 126B and the protrusion 124B are located side by side in the radial direction of the SOWC 1B, and the inner ear 122, the outer ear 123, the inclined surfaces 125B, and the protrusion 124B are located side by side in the radial direction of the SOWC 1B.

Figure 11:
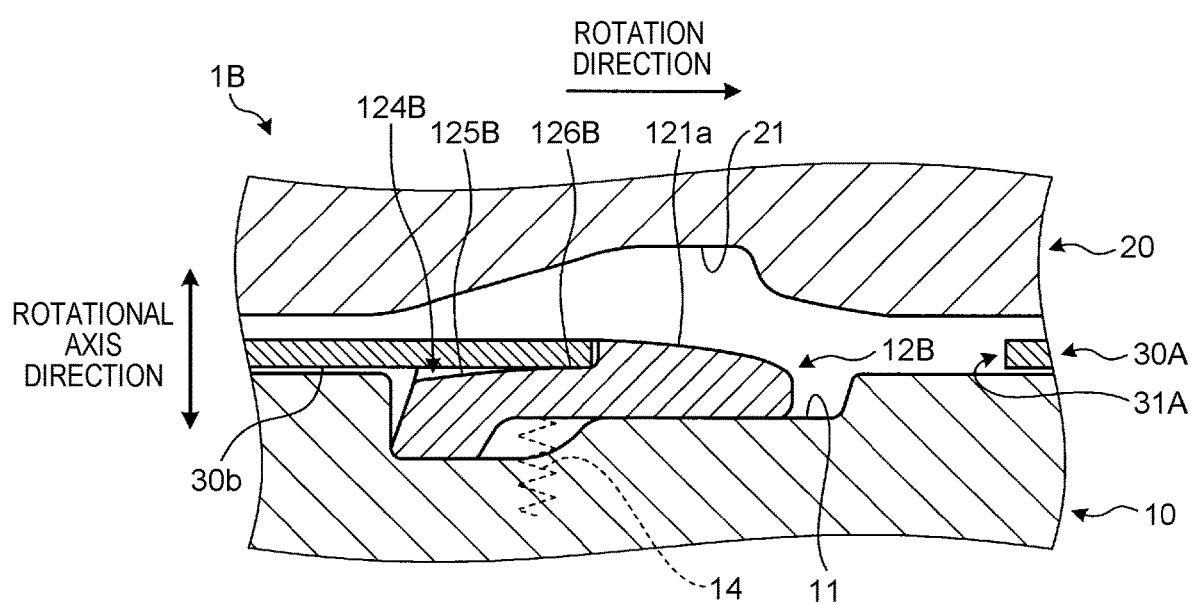
FIG. 11 is a perspective view showing a disengaged state of the selectable one-way clutch according to the third embodiment of the present disclosure.

According to the SOWC 1B of the third embodiment as has been described above, when the selector plate 30A is closed and the strut 12B is housed inside the pocket 11, as shown in FIG. 11, the lower surface 30b of the selector plate 30A and the flat contact portions 126B of the strut 12B come in surface contact with each other, so that the spring force of the elastic member 14 (trying to raise the strut 12B) acts nearly orthogonally to the lower surface 30b of the selector plate 30A. Thus, it is possible to resist the spring force of the elastic member 14 without requiring an external force.

The external force mentioned above refers to a force that is exerted by the actuator (not shown) on the selector plate 30A through the arm 40 (see FIG. 7), and a force that keeps the selector plate 30A closed as shown in FIG. 11. Thus, according to the SOWC 1B of this embodiment, it is possible to reduce the driving force of the actuator (not shown), and thereby to downsize the actuator and achieve cost reduction.

According to the SOWC 1B of the third embodiment, the protrusion 124B is provided so as to extend to the end of the main body 121B as in the first embodiment. Thus, the mechanical strength around the joint portions between the main body 121B and the inner and outer ears 122, 123 can be enhanced.

According to the SOWC 1B of the third embodiment, the inclined surfaces 125B are provided so as to extend to the end of the main body 121B as in the second embodiment. Thus, the thickness of the ends of the inclined surfaces 125B can be increased, and the rigidity and durability of the strut 12B can be thereby further enhanced.

An SOWC 1C according to a fourth embodiment will be described with reference to FIG. 12 and FIG. 13. The SOWC 1C according to this embodiment includes a strut 12C shown in FIG. 12 and a selector plate 30C shown in FIG. 13, but the configuration of the SOWC 1C is otherwise the same as that of the first embodiment.

The strut 12C is obtained by tapering the protrusion 124 of the strut 12 of the first embodiment. As shown in FIG. 12, the strut 12C includes a main body 121C, the inner ear 122, and the outer ear 123. A protrusion 124C is provided on the upper surface 121a of the main body 121C along the circumferential direction of the SOWC 1C. A pair of inclined surfaces 125C are provided respectively on both sides of the side surfaces 124b of the protrusion 124C. The main body 121C includes a flat portion 127C that is provided between the inner ear 122 and the outer ear 123 so as to connect the upper surface 122a of the inner ear 122 and the upper surface 123a of the outer ear 123 to each other. Thus, in the strut 12C, the upper surface 122a of the inner ear 122, the upper surface 123a of the outer ear 123, and the flat portion 127C form one flat surface.

The protrusion 124C has the side surfaces 124b that are inclined relative to the side surfaces 121b of the main body 121C, and the protrusion 124C is tapered toward the end of the main body 121C. The protrusion 124C has a V-shape when seen from above, and a bottom side of the V-shape has a linear shape. The side surfaces 124b of the protrusion 124C have a flat shape. In the strut 12C thus configured, the inclined surfaces 125C and the protrusion 124C are disposed side by side in the radial direction of the SOWC 1C, and the inner ear 122, the outer ear 123, and the flat portion 127C are disposed side by side in the radial direction of the SOWC 1C.

Figure 12:
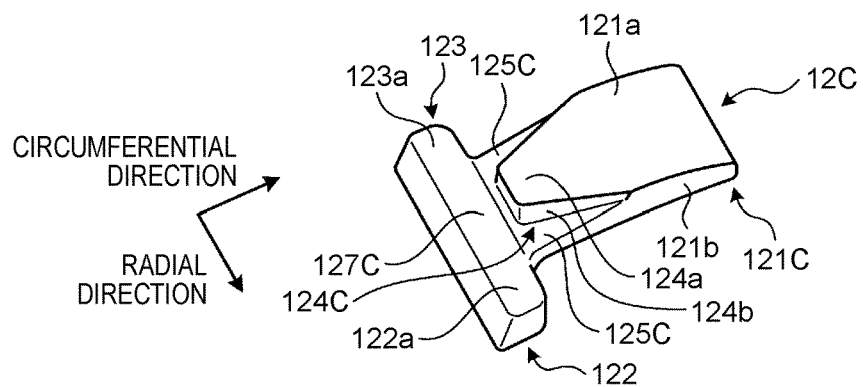
FIG. 12 is a perspective view showing the configuration of a strut of a selectable one-way clutch according to a fourth embodiment of the present disclosure.

While the side surfaces 124b of the protrusion 124C and the side surfaces 121b of the main body 121C both have a flat shape in FIG. 12, at least one of these side surfaces may have a curved shape with a predetermined radius of curvature. The above description that the side surfaces 124b of the protrusion 124C are inclined relative to the side surfaces 121b of the main body 121C means a case where both side surfaces are inclined at a predetermined angle or larger, and does not include a case where these are roughly (substantially) parallel to each other.

Figure 13:
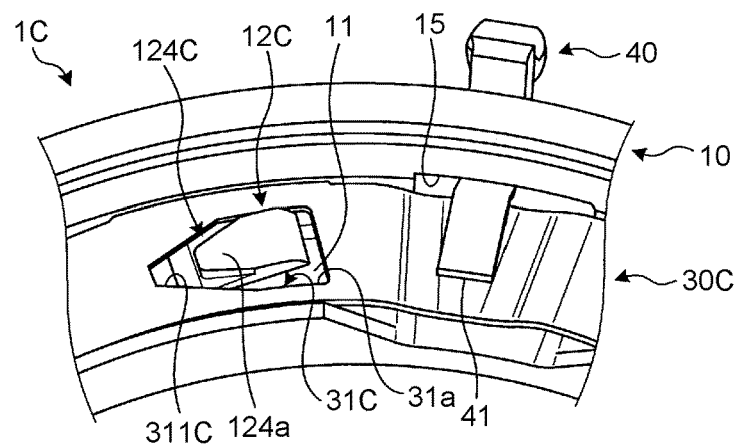
FIG. 13 is a view showing the configuration of a main part of the selectable one-way clutch according to the fourth embodiment of the present disclosure, and is a perspective view showing an engaged state of the selectable one-way clutch.

The selector plate 30C has a plurality of window holes 31C as shown in FIG. 13. The selector plate 30C further has a cutout groove 311C that is formed so as to extend from the inner surface 31a of the window hole 31C along the formation direction of the protrusion 124C of the strut 12C. Like the protrusion 124C, the cutout groove 311C is tapered, and an inner surface of the cutout groove 311C has a flat shape.

According to the SOWC 1C of the fourth embodiment as has been described above, when the cutout groove 311C of the selector plate 30C is fitted on the protrusion 124C of the strut 12C, the tapered surfaces of the cutout groove 311C and the protrusion 124C come in contact with each other, which can reduce the bending stress occurring on the selector plate 30C when the selector plate 30C is closed. Thus, it is possible to enhance the durability of the selector plate 30C and the actuation responsiveness of the strut 12C.

For example, in the first embodiment, corners 121c (see FIG. 3) are formed near an end of the protrusion 124 of the strut 12, and edges 31b (see FIG. 4) corresponding to the corners 121c are formed near an end of the cutout groove 311 of the selector plate 30. Accordingly, when the selector plate 30 is closed, the corners 121c of the strut 12 come in contact with the edges 31b of the selector plate 30, causing a bending stress on the edges 31b. In this embodiment, by contrast, the selector plate 30C does not have the edges 31b, so that the bending stress during contact with the strut 12C is reduced.

Figure 14:
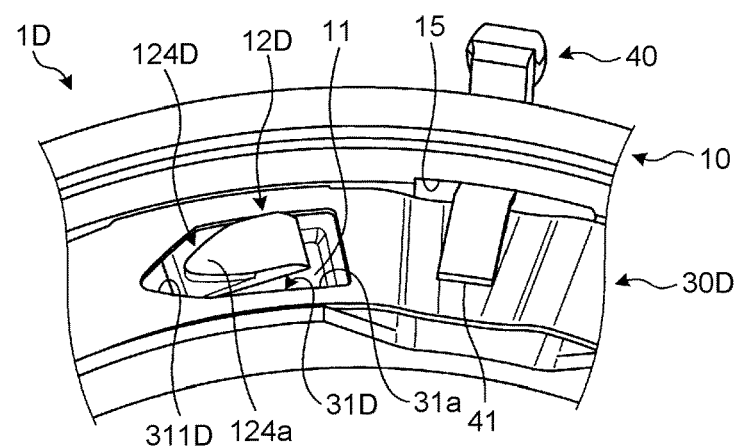
FIG. 14 is a view showing the configuration of a main part of a selectable one-way clutch according to a modified example of the fourth embodiment of the present disclosure, and is a perspective view showing an engaged state of the selectable one-way clutch.

Alternatively, in the SOWC 1C according to the fourth embodiment, the strut 12C and the selector plate 30C may be configured as shown in FIG. 14. In a modified example shown in FIG. 14, a protrusion 124D of a strut 12D is tapered like the strut 12C, but has a U-shape when seen from above. Moreover, the side surfaces 124b of the protrusion 124D have a curved shape toward a leading end of the protrusion 124D.

A cutout groove 311D of a window hole 31D of a selector plate 30D is tapered like the selector plate 30C, but has a U-shape when seen from above. Moreover, an inner surface of the cutout groove 311D has a curved shape toward a leading end of the cutout groove 311D.

According to the SOWC 1D of the modified example of the fourth embodiment as has been described above, when the cutout groove 311D of the selector plate 30D is fitted on the protrusion 124D of the strut 12D, the tapered curved surfaces of the cutout groove 311D and the protrusion 124D come in contact with each other, which can further reduce the bending stress occurring on the selector plate 30D when the selector plate 30D is closed. Thus, it is possible to further enhance the durability of the selector plate 30D and the actuation responsiveness of the strut 12D.

Figure 15:
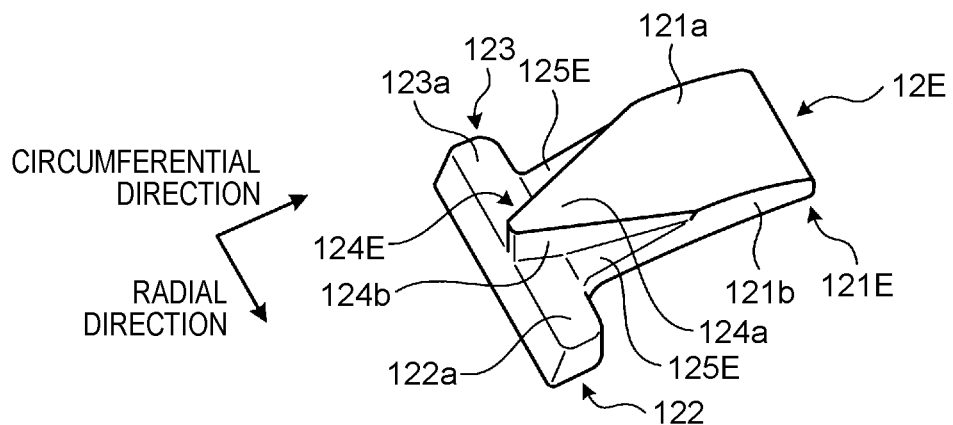
FIG. 15 is a perspective view showing the configuration of a strut of a selectable one-way clutch according to a fifth embodiment of the present disclosure.

An SOWC 1E according to a fifth embodiment will be described with reference to FIG. 15 and FIG. 16. The SOWC 1E according to this embodiment includes a strut 12E shown in FIG. 15 and a selector plate 30E shown in FIG. 16, but the configuration of the SOWC 1E is otherwise the same as that of the first embodiment.

The strut 12E is obtained by extending the protrusion 124C of the strut 12C of the fourth embodiment to the end of the main body 121C. As shown in FIG. 15, the strut 12E includes a main body 121E, the inner ear 122, and the outer ear 123. A protrusion 124E is provided on the upper surface 121a of the main body 121E along the circumferential direction of the SOWC 1E. A pair of inclined surfaces 125E are provided respectively on both sides of the side surfaces 124b of the protrusion 124E.

The protrusion 124E has the side surfaces 124b that are inclined relative to the side surfaces 121b of the main body 121E, and the protrusion 124E is tapered toward the end of the main body 121E. The protrusion 124E has a V-shape when seen from above. The side surfaces 124b of the protrusion 124E have a flat shape. In the strut 12E thus configured, the inclined surfaces 125E and the protrusion 124E are located side by side in the radial direction of the SOWC 1E, and the inner ear 122, the outer ear 123, and the protrusion 124E are located side by side in the radial direction of the SOWC 1E.

Figure 16:
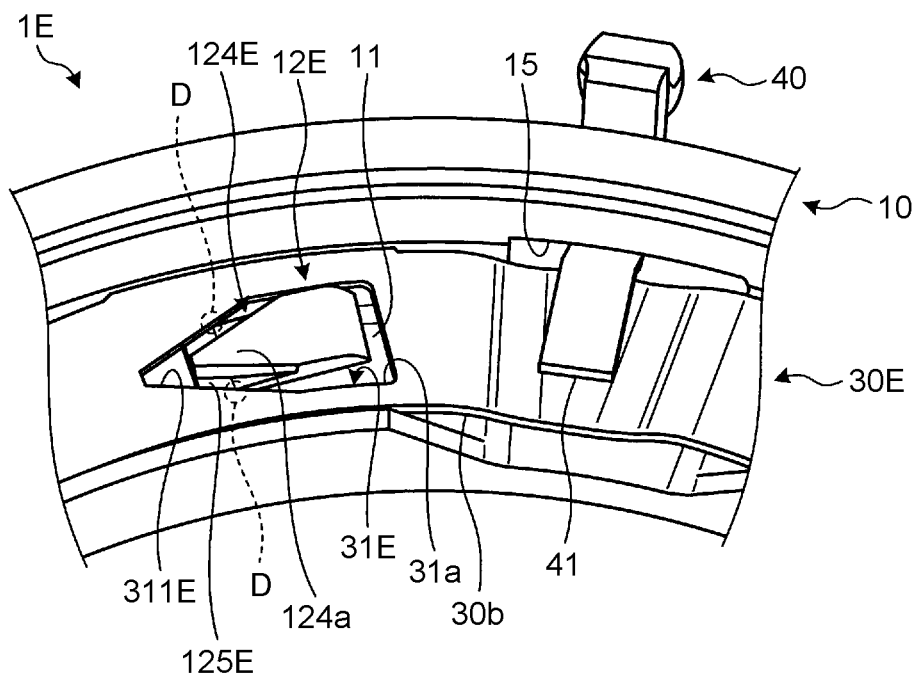
FIG. 16 is a view showing the configuration of a main part of the selectable one-way clutch according to the fifth embodiment of the present disclosure, and is a perspective view showing an engaged state of the selectable one-way clutch.

The selector plate 30E has a plurality of window holes 31E as shown in FIG. 16. The selector plate 30E further has a cutout groove 311E that is formed so as to extend from the inner surface 31a of the window hole 31E along the formation direction of the protrusion 124E of the strut 12E. Like the protrusion 124E, the cutout groove 311E is tapered, and an inner surface of the cutout groove 311E has a flat shape.

According to the SOWC 1E of the fifth embodiment as has been described above, the protrusion 124E is provided so as to extend to the end of the main body 121E as in the first embodiment. Thus, the mechanical strength around the joint portions between the main body 121E and the inner and outer ears 122, 123 can be enhanced.

According to the SOWC 1E, the bending stress occurring on the selector plate 30E when the selector plate 30E is closed can be reduced as in the fourth embodiment. Thus, it is possible to enhance the durability of the selector plate 30E and the actuation responsiveness of the strut 12E.

Figure 17:
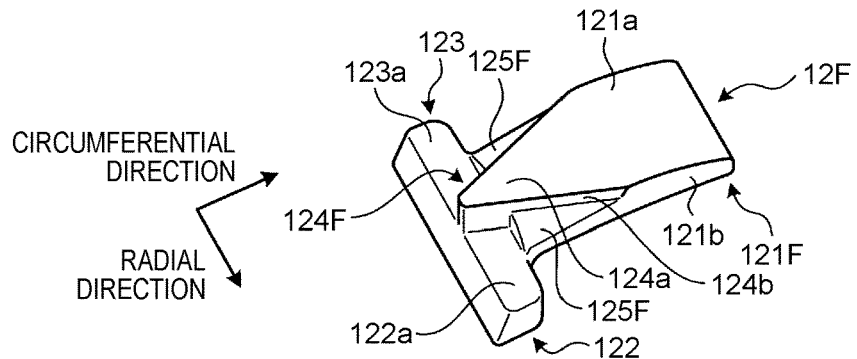
FIG. 17 is a perspective view showing the configuration of a strut of a selectable one-way clutch according to a sixth embodiment of the present disclosure.

An SOWC 1F according to a sixth embodiment will be described with reference to FIG. 17 to FIG. 18B. The SOWC 1F according to this embodiment includes a strut 12F shown in FIG. 17, but the configuration of the SOWC 1F is otherwise the same as that of the fifth embodiment.

The strut 12F is obtained by curving the inclined surfaces 125E of the strut 12E of the fifth embodiment. As shown in FIG. 17, the strut 12F includes a main body 121F, the inner ear 122, and the outer ear 123. A protrusion 124F is provided on the upper surface 121a of the main body 121F along the circumferential direction of the SOWC 1F. A pair of inclined surfaces 125F are provided respectively on both sides of the side surfaces 124b of the protrusion 124F. As the configuration of the protrusion 124F is the same as the configuration of the protrusion 124E of the fifth embodiment, the description of the protrusion 124F will be omitted.

The inclined surface 125F has a curved shape from the side surface 124b of the protrusion 124F to the side surface 121b of the main body 121F.

Here, for example, in the SOWC 1E according to the fifth embodiment, when the selector plate 30E switches from the released state to the closed state and the cutout groove 311E of the selector plate 30E is fitted on the protrusion 124E of the strut 12E, the lower surface 30b of the selector plate 30E and the inner surface 31a of the window hole 31E slide over the inclined surfaces 125E of the strut 12E while all the time remaining in point contact therewith as shown in parts D of FIG. 16.

Figure 18A:
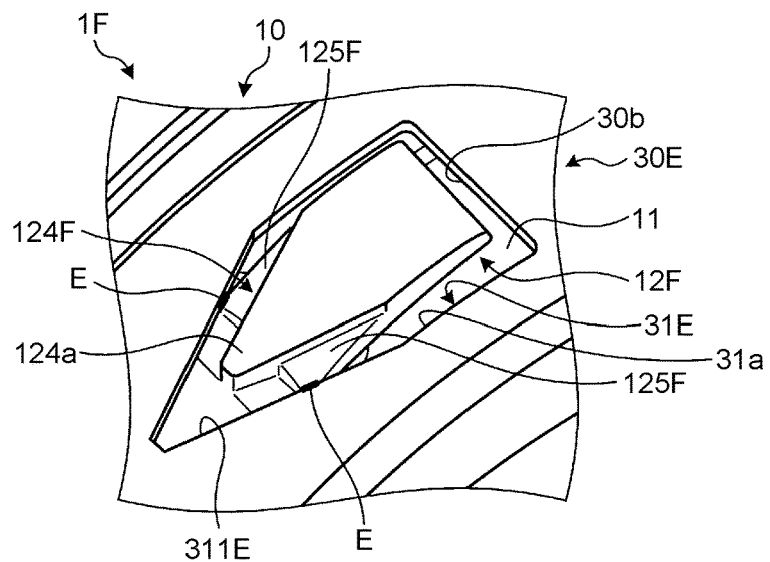
FIG. 18A is a view showing the configuration of a main part of the selectable one-way clutch according to the sixth embodiment of the present disclosure, and is a perspective view showing an engaged state of the selectable one-way clutch.
Figure 18B:
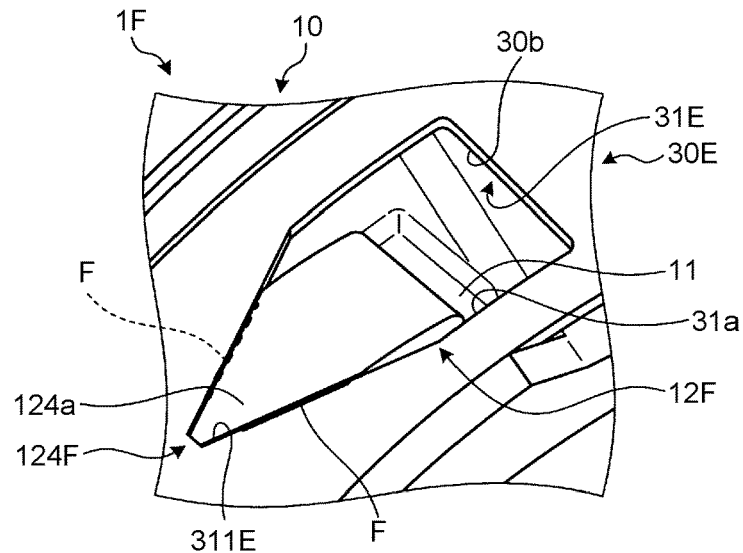
FIG. 18B is a view showing the configuration of the main part of the selectable one-way clutch according to the sixth embodiment of the present disclosure, and is a perspective view showing a disengaged state of the selectable one-way clutch.

By contrast, in the SOWC 1F according to the sixth embodiment, the inclined surfaces 125F have a curved shape, so that, when the cutout groove 311E of the selector plate 30E is fitted on the protrusion 124F of the strut 12F, the lower surface 30b of the selector plate 30E and the inner surface 31a of the window hole 31E slide over the inclined surfaces 125F of the strut 12F while all the time remaining in line contact therewith as shown in parts E of FIG. 18A and parts F of FIG. 18B. Thus, according to the SOWC 1F, it is possible to reduce the contact pressure between the selector plate 30E and the strut 12F, and thereby to enhance the wear resistance of the selector plate 30E and the strut 12F.

According to the SOWC 1F, the protrusion 124F is provided so as to extend to an end of the main body 121F as in the first embodiment. Thus, it is possible to enhance the mechanical strength around the joint portions between the main body 121F and the inner and outer ears 122, 123.

According to the SOWC 1F, the bending stress occurring on the selector plate 30E when the selector plate 30E is closed can be reduced as in the fourth embodiment. Thus, it is possible to enhance the durability of the selector plate 30E and the actuation responsiveness of the strut 12F.

Figure 19:
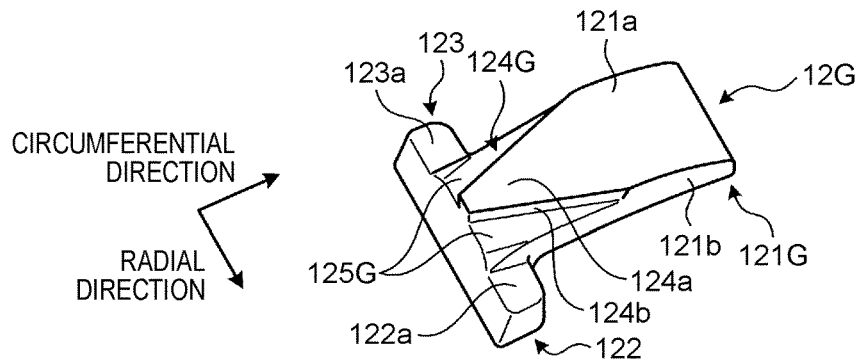
FIG. 19 is a perspective view showing the configuration of a strut of a selectable one-way clutch according to a seventh embodiment of the present disclosure.

An SOWC 1G according to a seventh embodiment will be described with reference to FIG. 19 to FIG. 20B. The SOWC 1G according to this embodiment includes a strut 12G shown in FIG. 19, but the configuration of the SOWC 1G is otherwise the same as that of the sixth embodiment.

The strut 12G is obtained by extending the inclined surfaces 125F of the strut 12F of the sixth embodiment to the end of the main body 121F. As shown in FIG. 19, the strut 12G includes a main body 121G, the inner ear 122, and the outer ear 123. A protrusion 124G is provided on the upper surface 121a of the main body 121G along the circumferential direction of the SOWC 1G. A pair of inclined surfaces 125G are provided respectively on both sides of the side surfaces 124b of the protrusion 124G. As the configuration of the protrusion 124G is the same as the configuration of the protrusion 124E of the fifth embodiment, the description of the protrusion 124G will be omitted.

The inclined surface 125G has a curved shape from the side surface 124b of the protrusion 124G to the side surface 121b of the main body 121G. Like the protrusion 124G, the inclined surfaces 125G are formed so as to extend to the end of the main body 121G. In the strut 12G thus configured, the inner ear 122, the outer ear 123, the inclined surfaces 125G, and the protrusion 124G are located side by side in the radial direction of the SOWC 1G.

Here, for example, in the SOWC 1F according to the sixth embodiment, the length of a contact line between the selector plate 30E and the strut 12F is short at a stage where the selector plate 30E starts to close as shown in parts E of FIG. 18A.

Figure 20A:
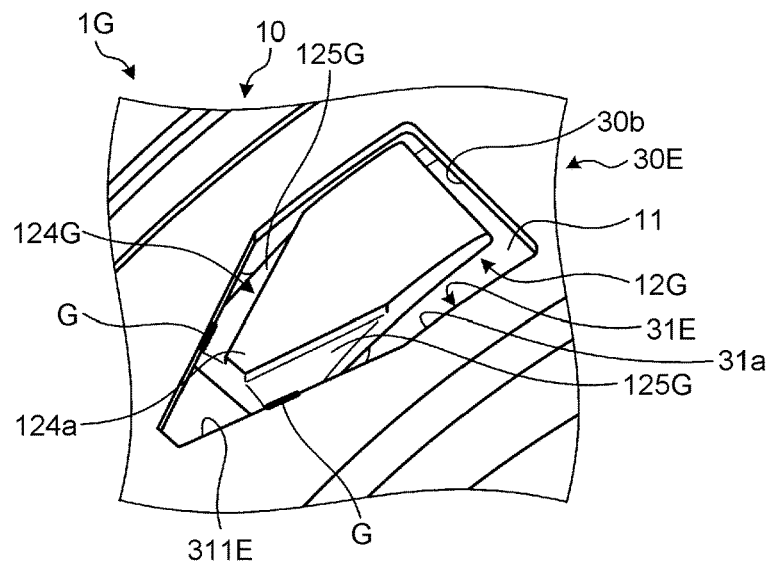
FIG. 20A is a view showing the configuration of a main part of the selectable one-way clutch according to the seventh embodiment of the present disclosure, and is a perspective view showing an engaged state of the selectable one-way clutch.
Figure 20B:
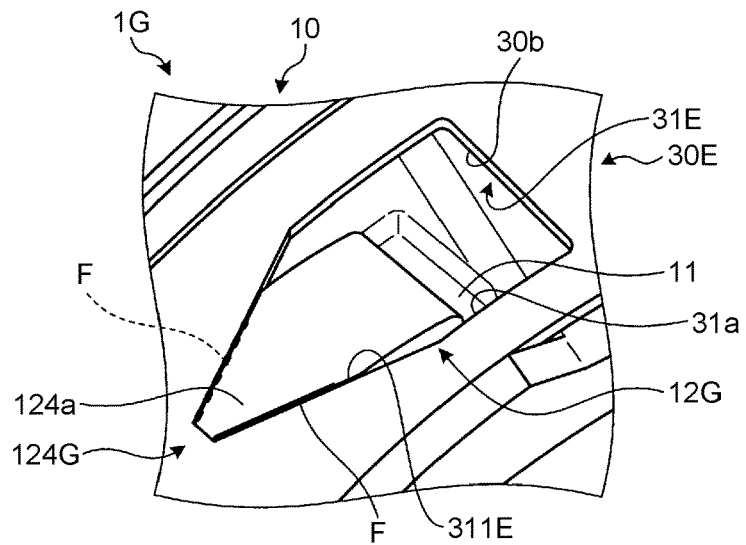
FIG. 20B is a view showing the configuration of the main part of the selectable one-way clutch according to the seventh embodiment of the present disclosure, and is a perspective view showing a disengaged state of the selectable one-way clutch.

By contrast, in the SOWC 1G according to the seventh embodiment, the curved inclined surfaces 125G are extended to the end of the main body 121G, so that, as shown in parts G of FIG. 20A, the length of a contact line between the selector plate 30E and the strut 12G at the stage where the selector plate 30E starts to close can be increased than that in the sixth embodiment. Thus, according to the SOWC 1G, it is possible to further reduce the contact pressure between the selector plate 30E and the strut 12G, and thereby to further enhance the wear resistance of the selector plate 30E and the strut 12G.

According to the SOWC 1G, the inclined surfaces 125G are provided so as to extend to the end of the main body 121G as in the second embodiment. Thus, it is possible to increase the thickness of the ends of the inclined surfaces 125G, and thereby to further enhance the rigidity and durability of the strut 12G.

According to the SOWC 1G, the protrusion 124G is provided so as to extend to the end of the main body 121G as in the first embodiment. Thus, it is possible to enhance the mechanical strength around the joint portions between the main body 121G and the inner and outer ears 122, 123.

According to the SOWC 1G, the bending stress occurring on the selector plate 30E when the selector plate 30E is closed can be reduced as in the fourth embodiment. Thus, it is possible to enhance the durability of the selector plate 30E and the actuation responsiveness of the strut 12G.

Figure 21:
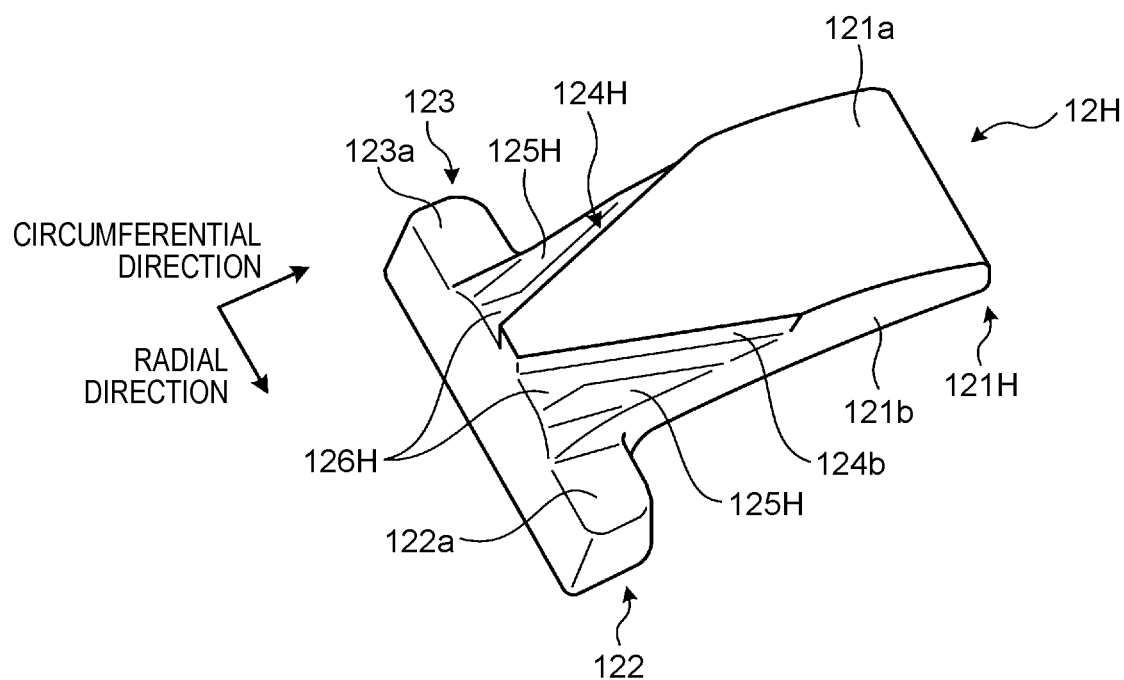
FIG. 21 is a perspective view showing the configuration of a strut of a selectable one-way clutch according to an eighth embodiment of the present disclosure.

An SOWC according to an eighth embodiment will be described with reference to FIG. 21. The SOWC according to this embodiment includes a strut 12H shown in FIG. 21, but the configuration of this SOWC is otherwise the same as that of the seventh embodiment.

The strut 12H is obtained by imparting a flat shape to a portion of each inclined surface 125G of the strut 12G of the seventh embodiment. As shown in FIG. 21, the strut 12H includes a main body 121H, the inner ear 122, and the outer ear 123. A protrusion 124H is provided on the upper surface 121a of the main body 121H along the circumferential direction of the SOWC. A pair of inclined surfaces 125H are provided respectively on both sides of the side surfaces 124b of the protrusion 124H. A flat contact portion 126H is provided at the position of the top of each inclined surface 125H, i.e., between the inclined surface 125H and the side surface 124b of the protrusion 124H. As the configuration of the protrusion 124H is the same as the configuration of the protrusion 124G of the seventh embodiment, the description of the protrusion 124H will be omitted.

Specifically, the flat contact portion 126H is provided at a position within the inclined surface 125H at which the lower surface 30b of the selector plate 30E (see FIG. 20A) comes in contact when the selector plate 30E is closed (when the SOWC is disengaged), i.e., a position within the inclined surface 125H at which the lower surface 30b comes in contact when the selector plate 30E makes a full stroke. The flat contact portion 126H is formed so as to be parallel to the lower surface 30b of the selector plate 30E when the selector plate 30E is closed.

According to the SOWC of the eighth embodiment as has been described above, the lower surface 30b of the selector plate 30E (see FIG. 20A) and the flat contact portions 126H of the strut 12H come in surface contact with each other as in the third embodiment. Thus, it is possible to resist the spring force of the elastic member 14 without requiring an external force.

According to the SOWC of the eighth embodiment, the protrusion 124H is provided so as to extend to the end of the main body 121H as in the first embodiment. Thus, it is possible to enhance the mechanical strength around the joint portions between the main body 121H and the inner and outer ears 122, 123.

According to the SOWC of the eighth embodiment, the inclined surfaces 125H are provided so as to extend to the end of the main body 121H as in the second embodiment. Thus, it is possible to increase the thickness of the ends of the inclined surfaces 125H, and thereby to further enhance the rigidity and durability of the strut 12H.

According to the SOWC of the eighth embodiment, the bending stress occurring on the selector plate 30E (see FIG. 20A) when the selector plate 30E is closed can be reduced as in the fourth embodiment. Thus, it is possible to enhance the durability of the selector plate 30E and the actuation responsiveness of the strut 12H.

According to the SOWC of the eighth embodiment, the curved inclined surfaces 125H are extended to the end of the main body 121H as in the sixth embodiment. Thus, it is possible to further reduce the contact pressure between the selector plate 30E (see FIG. 20A) and the strut 12H, and thereby to further enhance the wear resistance of the selector plate 30E and the strut 12H.

While the selectable one-way clutches according to the present disclosure have been specifically described based on the embodiments, the scope of the present disclosure is not limited to these embodiments but should be interpreted broadly based on the description of the claims. It is to be understood that the embodiments with various modifications and improvements made thereto based on the above description are included in the scope of the present disclosure.

For example, in the SOWCs according to the second embodiment to the eighth embodiment, in the radial direction of the SOWCs, the clearance between the side surface 121b of the main bodies 121A to 121H of the struts 12A to 12H and the inner surface 31a of the window holes 31A to 31E of the selector plates 30A to 30E is preferably set to be smaller than the clearance between the side surface 121b of the main bodies 121A to 121H of the struts 12A to 12H and the inner surface 11a of the pocket 11, as in the SOWC 1 according to the first embodiment. Thus, it is possible to further reduce the yaw moment My and the translational force F1 occurring on the struts 12A to 12H, and to further reduce the force with which one or both of the inner ear 122 and the outer ear 123 of the struts 12A to 12H hit the inner surface 11a of the pocket 11.

In the SOWCs according to the second embodiment to the eighth embodiment, the angle of the inclined surfaces 125A to 125H relative to the lower surface 30b of the selector plates 30A to 30E when the struts 12A to 12H are raised from the pocket plate 10 toward the notch plate 20 through the window holes 31A to 31E during an overrun is preferably set to be larger than the angle of the upper surface 121a of the main bodies 121A to 121H of the struts 12A to 12H relative to the lower surface 30b of the selector plates 30A to 30E, as in the SOWC 1 according to the first embodiment. Thus, it is possible to reduce the amount of stroke of the actuator (not shown) that actuates the arm 40, and thereby to downsize the actuator and achieve cost reduction.

The flat contact portions 126B provided in the SOWC 1B according to the third embodiment may be provided in the SOWC 1 according to the first embodiment. In this case, the flat contact portion 126B can be provided at a position within the inclined surface 125 of the first embodiment at which the lower surface 30b of the selector plate 30 comes in contact when the selector plate 30 is closed (when the SOWC 1 is disengaged).

The flat contact portions 126H provided in the SOWC according to the eighth embodiment may be provided in the SOWCs according to the fourth embodiment to the sixth embodiment. In this case, the flat contact portion 126H can be provided at a position within the inclined surfaces 125C to 125F of the fourth embodiment to the sixth embodiment at which the lower surface 30b of the selector plates 30C to 30E comes in contact when the selector plates 30C to 30E are closed (when the SOWCs are disengaged).

The flat contact portions 126B provided in the SOWC 1B according to the third embodiment may be provided in the SOWCs according to the fourth embodiment to the eighth embodiment, or the flat contact portions 126H provided in the SOWC according to the eighth embodiment may be provided in the SOWCs according to the first embodiment to the third embodiment.

In the SOWCs according to the fifth embodiment to the eighth embodiment, the protrusions 124E to 124H have a V-shape when seen from above. Alternatively, the protrusions 124E to 124H may have a U-shape when seen from above, as in the SOWC 1D according to the modified example of the fourth embodiment.

In the SOWCs according to the first embodiment to the third embodiment, the protrusions 124 to 124B may be provided so as not to extend to the end of the main bodies 121 to 121B, and a flat portion that connects the upper surface 122a of the inner ear 122 and the upper surface 123a of the outer ear 123 to each other may be provided between the inner ear 122 and the outer ear 123 as in the SOWC 1C according to the fourth embodiment.

In the SOWCs according to the first embodiment to the third embodiment, the inclined surfaces 125 to 125B may have a curved shape like the inclined surfaces 125F of the SOWC 1F according to the sixth embodiment.

In the SOWC 1E according to the fifth embodiment, the inclined surfaces 125E may be provided so as to extend to the end of the main body 121E like the inclined surfaces 125G of the SOWC 1G according to the seventh embodiment.

In the SOWCs according to the first embodiment to the eighth embodiment, the upper surface 121a of the main bodies 121 to 121H has a gently curved shape, but the upper surface 121a may instead have a flat shape.

What is claimed is:

1. A selectable one-way clutch comprising:
a pocket plate having a plurality of housing recesses in a surface on one side;
engaging tabs respectively housed in the housing recesses;
a notch plate provided so as to be rotatable relative to the pocket plate, and having a plurality of engaging recesses in a surface facing the surface of the pocket plate on the one side; and
a selector plate located between the pocket plate and the notch plate, the selector plate having a plurality of window holes extending therethrough in a plate thickness direction, the selector plate being configured to rotate coaxially with a rotational axis of the notch plate so as to switch between a state in which the engaging tabs are raised from the pocket plate toward the notch plate through one of the plurality of window holes and a state in which the engaging tabs are housed in one of the plurality of housing recesses,
the engaging tabs each including a protrusion provided at its center in a radial direction of the selectable one-way clutch,
the selector plate has a cutout groove provided so as to extend from one of the plurality of window holes along a formation direction of the protrusion, and
the cutout groove is fitted on the protrusion and the engaging tabs and the selector plate overlap each other in a rotational axis direction of the selectable one-way clutch when the selectable one-way clutch is disengaged, wherein
each of the engaging tabs includes a main body extending along a circumferential direction of the selectable one-way clutch, and a pair of ears extending along the radial direction from an end of the main body in the circumferential direction toward opposite sides of the end of the main body, and the pair of ears constitute a rotational axis of each of the engaging tabs when the engaging tabs are raised,
the main body includes the protrusion protruding from a position of an upper surface of the pair of ears,
an upper surface of the protrusion comes in contact with the notch plate when the engaging tabs are raised from the pocket plate toward the notch plate through one of the plurality of window holes,
the protrusion has side surfaces inclined relative to side surfaces of the main body, and is tapered toward the end of the main body on a side of the pair of ears, and
the engaging tabs each includes inclined surfaces provided respectively on both sides of the side surfaces of the protrusion and inclined relative to the upper surface of the pair of ears.

2. The selectable one-way clutch according to claim 1, wherein the inclined surfaces each have a curved shape from the side surfaces of the protrusion to the side surfaces of the main body.

3. The selectable one-way clutch according to claim 1, wherein, in the radial direction, a clearance between a side surface of each of the engaging tabs and an inner surface of one of the window holes is smaller than a clearance between the side surface of each of the engaging tabs and a side surface of the housing recess.

4. The selectable one-way clutch according to claim 1, wherein the cutout groove is shaped from an end of the window hole in the circumferential direction.

5. The selectable one-way clutch according to claim 1, wherein the cutout groove is provided at the center of the selector plate in a radial direction of the selectable one-way clutch.

6. A selectable one-way clutch comprising:
a pocket plate having a plurality of housing recesses in a surface on one side;
engaging tabs respectively housed in the housing recesses;
a notch plate provided so as to be rotatable relative to the pocket plate, and having a plurality of engaging recesses in a surface facing the surface of the pocket plate on the one side; and
a selector plate located between the pocket plate and the notch plate, the selector plate having a plurality of window holes extending therethrough in a plate thickness direction, the selector plate being configured to rotate coaxially with a rotational axis of the notch plate so as to switch between a state in which the engaging tabs are raised from the pocket plate toward the notch plate through one of the plurality of window holes and a state in which the engaging tabs are housed in one of the plurality of housing recesses,
the engaging tabs each including a protrusion provided at its center in a radial direction of the selectable one-way clutch,
the selector plate has a cutout groove provided so as to extend from one of the plurality of window holes along a formation direction of the protrusion, and the cutout groove is fitted on the protrusion and the engaging tabs and the selector plate overlap each other in a rotational axis direction of the selectable one-way clutch when the selectable one-way clutch is disengaged, wherein each of the engaging tabs includes a main body extending along a circumferential direction of the selectable one-way clutch, and a pair of ears extending along the radial direction from an end of the main body in the circumferential direction toward opposite sides of the end of the main body, and the pair of ears constitute a rotational axis of each of the engaging tabs when the engaging tabs are raised, the main body includes the protrusion protruding from a position of an upper surface of the pair of ears, an upper surface of the protrusion comes in contact with the notch plate when the engaging tabs are raised from the pocket plate toward the notch plate through one of the plurality of window holes, the protrusion has side surfaces parallel to side surfaces of the main body, and protrudes to the end of the main body on a side of the pair of ears, the engaging tabs each includes inclined surfaces provided respectively on both sides of the side surfaces of the protrusion and inclined relative to the upper surface of the pair of ears, and the pair of ears, the inclined surfaces, and the protrusion are located side by side in the radial direction.

7. The selectable one-way clutch according to claim 6, wherein the inclined surfaces include a flat contact portion parallel to a lower surface of the selector plate, and the flat contact portion is provided at a position within the inclined surfaces where the lower surface of the selector plate comes in contact when the selectable one-way clutch is disengaged.

8. The selectable one-way clutch according to claim 6, wherein, in the state in which the engaging tabs are raised from the pocket plate toward the notch plate through one of the window holes, an angle of the inclined surface relative to a lower surface of the selector plate is larger than an angle of an upper surface of each of the engaging tabs relative to the lower surface of the selector plate.

* * * * *